US012087499B1

(12) United States Patent
Teel et al.

(10) Patent No.: US 12,087,499 B1
(45) Date of Patent: Sep. 10, 2024

(54) SYSTEMS AND METHODS FOR AMPLIFYING POWER

(71) Applicant: Teelson, LLC, Alachua, FL (US)

(72) Inventors: George Edward Teel, Alachua, FL (US); Douglas Earl Johnson, Alachua, FL (US)

(73) Assignee: Teelson, LLC, Alachua, FL (US)

( * ) Notice: Subject to any disclaimer, the term of this patent is extended or adjusted under 35 U.S.C. 154(b) by 0 days.

(21) Appl. No.: 18/506,425

(22) Filed: Nov. 10, 2023

(51) Int. Cl.
*H01F 27/28* (2006.01)
*H01F 27/32* (2006.01)
*H01F 27/42* (2006.01)
*H01F 38/14* (2006.01)

(52) U.S. Cl.
CPC ......... *H01F 27/42* (2013.01); *H01F 27/2828* (2013.01); *H01F 27/2895* (2013.01); *H01F 27/32* (2013.01); *H01F 38/14* (2013.01)

(58) Field of Classification Search
CPC ........................................................ H01F 27/42
USPC .................................................. 336/170, 229
See application file for complete search history.

(56) References Cited

U.S. PATENT DOCUMENTS 1,504,882 A * 8/1924 Elmen .................... H01B 11/16 336/170
2,244,386 A * 6/1941 Guglielmo .............. H01F 38/34 336/212
2,782,269 A * 2/1957 Grant ......................... H03F 9/02 330/8
2,802,186 A * 8/1957 Dewitz ................. H01F 29/146 336/171
3,541,428 A * 11/1970 Schwarz ................. H01F 19/02 331/113 R
4,118,597 A * 10/1978 Proctor ............... H04M 3/2272 361/45
6,300,857 B1 * 10/2001 Herwig ................. H01F 27/324 336/198
6,414,493 B1 * 7/2002 Rezvani ................. G01R 27/22 324/442
7,372,354 B2 * 5/2008 Petersen .............. G01R 15/185 336/229
2006/0186981 A1 * 8/2006 Jang ........................ H01F 30/06 336/215
2008/0266042 A1 * 10/2008 Yoshimura .......... H01F 27/2804 336/181
2019/0103217 A1 * 4/2019 Pallesgaard ............. H01F 27/38

* cited by examiner

*Primary Examiner* — Ronald Hinson

(74) *Attorney, Agent, or Firm* — Saliwanchik, Lloyd & Eisenschenk

(57) ABSTRACT

Systems and methods for amplifying power, voltage, and current are provided. A system can include one or more inductors, each inductor including a magnetic core, a primary winding, and a secondary winding. The secondary winding can include two secondary winding wires, and the secondary winding wires can be connected to each other by a connection wire.

20 Claims, 37 Drawing Sheets

Parallel System-Toroid Form Factor

Single System-Linear Form Factor

Single System-Toroid Form Factor

Parallel System-Linear Form Factor

Parallel System-Linear Form Factor

Parallel System-Linear Form Factor

Parallel System-Toroid Form Factor

Parallel System-Toroid Form Factor

Parallel System-Toroid Form Factor

DC Pulse Input Illustration

Test Data from Single System-Linear Form Factor

| | DC Pulse Frequency (Hz) | Input Voltage (V) | Input Current (mA) | Input Power (mW) | Output Voltage (V) | Output Current (mA) | Output Power (mW) |
|---|---|---|---|---|---|---|---|
| | 60 | 5.00 | 0.22 | 1.10 | 2.83 | 0.16 | 0.45 |
| | 120 | 5.00 | 0.22 | 1.10 | 3.99 | 0.22 | 0.88 |
| | 240 | 5.00 | 0.22 | 1.10 | 5.84 | 0.29 | 1.69 |
| | 480 | 5.00 | 0.22 | 1.10 | 6.68 | 0.36 | 2.40 |
| | 960 | 5.00 | 0.22 | 1.10 | 7.55 | 0.41 | 3.10 |
| | 1,820 | 5.00 | 0.22 | 1.10 | 8.80 | 0.40 | 3.52 |
| ** | 2,090 | 5.00 | 0.22 | 1.10 | 8.11 | 0.48 | 3.89 |
| | 3,640 | 5.00 | 0.22 | 1.10 | 5.65 | 0.44 | 2.49 |
| | 7,280 | 5.00 | 0.22 | 1.10 | 0.03 | 0.07 | 0.00 |

** Approximate resonant Frequency of Core to Obtain Highest Amperage

FIG. 11

Test Data from Parallel System-Linear Form Factor

| | DC Pulse Frequency (Hz) | Input Voltage (V) | Input Current (mA) | Input Power (mW) | Output Voltage (V) | Output Current (mA) | Output Power (mW) |
|---|---|---|---|---|---|---|---|
| | 60 | 5.00 | 0.22 | 1.10 | 2.80 | 0.97 | 2.72 |
| | 120 | 5.00 | 0.22 | 1.10 | 3.88 | 1.35 | 5.24 |
| | 240 | 5.00 | 0.22 | 1.10 | 6.45 | 1.90 | 12.26 |
| | 480 | 5.00 | 0.22 | 1.10 | 8.35 | 2.52 | 21.04 |
| | 960 | 5.00 | 0.22 | 1.10 | 10.00 | 3.08 | 30.80 |
| | 1,820 | 5.00 | 0.22 | 1.10 | 11.37 | 3.51 | 39.91 |
| ** | 2,090 | 5.00 | 0.22 | 1.10 | 11.69 | 3.97 | 46.41 |
| | 3,640 | 5.00 | 0.22 | 1.10 | 8.65 | 3.39 | 29.32 |
| | 7,280 | 5.00 | 0.22 | 1.10 | 0.59 | 0.35 | 0.21 |

** Approximate resonant Frequency of Core to Obtain Highest Amperage

FIG. 13

Test Data from Single System-Toroid Form Factor

| | DC Pulse Frequency (Hz) | Input Voltage (V) | Input Current (mA) | Input Power (mW) | Output Voltage (V) | Output Current (mA) | Output Power (mW) |
|---|---|---|---|---|---|---|---|
| | 60 | 5.00 | 0.22 | 1.10 | 4.15 | 0.47 | 1.95 |
| | 120 | 5.00 | 0.22 | 1.10 | 6.58 | 0.63 | 4.15 |
| | 240 | 5.00 | 0.22 | 1.10 | 8.39 | 0.74 | 6.21 |
| | 480 | 5.00 | 0.22 | 1.10 | 9.73 | 0.66 | 6.42 |
| | 960 | 5.00 | 0.22 | 1.10 | 10.39 | 0.64 | 6.65 |
| | 1,820 | 5.00 | 0.22 | 1.10 | 10.49 | 0.58 | 6.08 |
| ** | 2,090 | 5.00 | 0.22 | 1.10 | 10.41 | 0.61 | 6.35 |
| | 3,640 | 5.00 | 0.22 | 1.10 | 6.95 | 0.74 | 5.14 |
| | 7,280 | 5.00 | 0.22 | 1.10 | 3.28 | 0.12 | 0.39 |

** Approximate resonant Frequency of Core to Obtain Highest Amperage

FIG. 15

Test Data from Parallel System-Toroid Form Factor

| | DC Pulse Frequency (Hz) | Input Voltage (V) | Input Current (mA) | Input Power (mW) | Output Voltage (V) | Output Current (mA) | Output Power (mW) |
|---|---|---|---|---|---|---|---|
| | 60 | 5.00 | 0.22 | 1.10 | 3.49 | 1.39 | 4.85 |
| | 120 | 5.00 | 0.22 | 1.10 | 7.44 | 1.97 | 14.66 |
| | 240 | 5.00 | 0.22 | 1.10 | 10.41 | 2.89 | 30.08 |
| | 480 | 5.00 | 0.22 | 1.10 | 13.55 | 3.69 | 50.00 |
| | 960 | 5.00 | 0.22 | 1.10 | 15.69 | 3.91 | 61.35 |
| | 1,820 | 5.00 | 0.22 | 1.10 | 16.66 | 3.77 | 62.81 |
| ** | 2,090 | 5.00 | 0.22 | 1.10 | 16.75 | 3.80 | 63.65 |
| | 3,640 | 5.00 | 0.22 | 1.10 | 11.71 | 2.95 | 34.54 |
| | 7,280 | 5.00 | 0.22 | 1.10 | 0.59 | 0.31 | 0.18 |

** Approximate resonant Frequency of Core to Obtain Highest Amperage

FIG. 17

Linear Form Factor

Ln = Length between nodes (55.2% of Core length)
Le = Length from node to end of core (22.4% of Core length)

Bending Linear Form Factor into Toroid Form Factor

Toroid Form Factor With Nodal Realignment

Linear Form Factor

Single System

Inductor (Left Side)

| LRC Data @ 2097Hz | FIG. 3B: 301A, 306A | FIG. 3B: 303A, 307A | FIG.3B: 305A, 308A | FIG. 4: 305A, 307A |
|---|---|---|---|---|
| ohm Rs | 41.53 | 97.57 | 97.86 | 391.37 |
| ohms Zs | 66.51 | 148.61 | 148.59 | 593.6 |
| Henry | 3.9427 mH | 8.507 mH | 8.487 mH | 33.871 mH |
| Farad | 1.4610 uF | 0.6771 uF | 0.6787 uF | 0.17007 uF |

Inductor (Right Side)

| LRC Data @ 2097Hz | FIG. 3B: 301A, 306A | FIG. 3B: 303A, 307A | FIG.3B: 305A, 308A | FIG. 4: 305A, 307A |
|---|---|---|---|---|
| ohm Rs | 40.4 | 95.23 | 94.75 | 383.61 |
| ohms Zs | 66.4 | 146.12 | 145.12 | 585 |
| Henry | 3.999 mH | 8.413 mH | 8.336 mH | 33.52 mH |
| Farad | 1.440 uF | 0.6847 uF | 0.6911 uF | 0.17185 uF |

Parallel System

Inductors (Combined)

| LRC Data @ 2097Hz | FIG. 5C 301C, 306C | FIG. 5C: 303B, 308A |
|---|---|---|
| ohm Rs | 20.074 | 779 |
| ohms Zs | 32.86 | 1183.8 |
| Henry | 1.945 mH | 67.67 mH |
| Farad | 2.9174 uF | 0.08513 uF |

Toroid Form Factor

Single System

Inductor (Left Side)

| LRC Data @ 2097Hz | FIG. 3B: 301A, 306A | FIG. 3B: 303A, 307A | FIG.3B: 305A, 308A | FIG. 4: 305A, 307A |
|---|---|---|---|---|
| ohm Rs | 83.27 | 231.99 | 174.9 | 789.9 |
| ohms Zs | 134.3 | 340.03 | 280.39 | 1249.5 |
| Henry | 7.997 mH | 20.178 mH | 16.633 mH | 73.48 mH |
| Farad | 0.7203 uF | 0.28548 uF | 0.34633 uF | 0.07839 uF |

Inductor (Right Side)

| LRC Data @ 2097Hz | FIG. 3B: 301A, 306A | FIG. 3B: 303A, 307A | FIG.3B: 305A, 308A | FIG. 4: 305A, 307A |
|---|---|---|---|---|
| ohm Rs | 81.23 | 194.71 | 197.55 | 798.8 |
| ohms Zs | 129.05 | 307.12 | 310.81 | 1244.6 |
| Henry | 7.631 mH | 18.026 mH | 18.211 mH | 72.44 mH |
| Farad | 0.7568 uF | 0.31956 uF | 0.31630 uF | 0.07952 uF |

Parallel System

Inductors (Combined)

| LRC Data @ 2097Hz | FIG. 5C 301C, 306C | FIG. 5C: 303B, 308A |
|---|---|---|
| ohm Rs | 42.73 | 1581.3 |
| ohms Zs | 66.98 | 2487.5 |
| Henry | 3.9157 mH | 145.74 mH |
| Farad | 0.0014710 uF | 0.039527 uF |

FIG. 22

SYSTEMS AND METHODS FOR AMPLIFYING POWER

BACKGROUND

In a coupled inductor, a voltage is induced in one coil by the changing magnetic field generated by the current flowing in the other coil. The process of generating a magnetic field and inducing a current in the other coil is known as mutual inductance and is described by Faraday's law of induction.

A direct current (DC) pulse generator can rapidly turn current on and off. When the current is on, the current flows through the primary winding, creating a magnetic field that induces a voltage in the secondary winding. When the current is off, the current stops and the magnetic field collapses and this induces a voltage in the secondary winding.

BRIEF SUMMARY

Embodiments of the subject invention provide novel and advantageous systems and methods for amplifying power, voltage, and/or current. A system can include one or more inductors (e.g., a single-inductor system or a parallel inductor system), each inductor including a magnetic core, a primary winding, and a secondary winding. A magnetic field and a linear magnetic wave can be created within and around the magnetic core.

Direct current (DC) pulses create a time-varying magnetic field that induces a magnetic field that is radically different than the smooth sine wave produced by an alternating current (AC) wave. The magnetic field created by a DC pulse is a more abrupt field where there is a violent disruption of area enclosed within the coil. Related art coupled inductors focus on the magnetic field as the primary method to induce a voltage in the secondary windings. Embodiments of the subject invention increase the scope of the forces to include an additional effect described herein as a linear magnetic wave. The linear magnetic wave is generated as the pulse frequency approaches the harmonic frequency of the core. This linear magnetic wave is created and collapses with the magnetic field and induces a proportional increase in the power output of the coupled inductor. By combining the counter electromotive force (EMF) from the magnetic wave and the linear magnetic wave, the power can be amplified to several times higher than the input power.

BRIEF DESCRIPTION OF DRAWINGS

The figures are provided for illustrative clarity and are not to scale.

FIG. 3C shows the positioning of the primary winding 103, the secondary windings 102A,102B, and the magnetic core 101 relative to each other. FIG. 3C also shows connection wires 400, the DC pulse primary input 301A, the DC pulse primary output 306A, and the amplified outputs 305A,307A.

In FIG. 6A, F represents frequency (in Hertz (Hz)), and T represents time.

In FIG. 6B, F represents frequency (in Hertz (Hz)), and T represents time.

FIG. 11 shows a table for a single inductor system (linear form factor), according to an embodiment of the subject invention, where the voltage and current are measured from the output of the secondary winding wires at points 305A and 307A shown in FIG. 4. Variance in the DC pulse frequency results in the variation of the resultant output power.

FIG. 13 shows a table for a parallel inductor system (linear form factor), according to an embodiment of the subject invention, where the voltage and current are measured from the output of the secondary winding wires at points 303B and 308A shown in FIG. 5C. Variance in the DC pulse frequency results in the variation of the resultant output power.

FIG. 15 shows a table for a single inductor system, (toroid from factor) according to an embodiment of the subject invention, where the voltage and current are measured from the output of the secondary winding wires at points 305A and 307A shown in FIG. 4. Variance in the DC pulse frequency results in the variation of the resultant output power.

FIG. 17 shows a table for a parallel inductor system (toroid from factor), according to an embodiment of the subject invention, where the voltage and current are measured from the output of the secondary winding wires at points 303B and 308A shown in FIG. 5C. Variance in the DC pulse frequency results in the variation of the resultant output power.

the solid line with the downward-pointing triangle data points is for output voltage; the dashed line with the circle data points is for input current; and the solid line with the circle data points is for output current.

Figure 19:
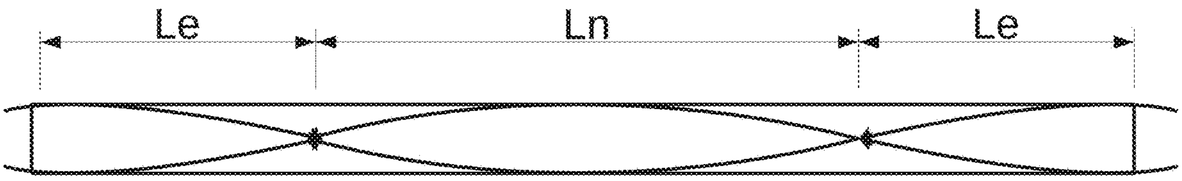

FIG. 19 shows a representation of the resonant wave in a linear form factor, such as a linear inductor system according to an embodiment of the subject invention. Though certain percentages are shown in FIG. 19, these are for exemplary purposes and should not be construed as limiting.

Figure 20:
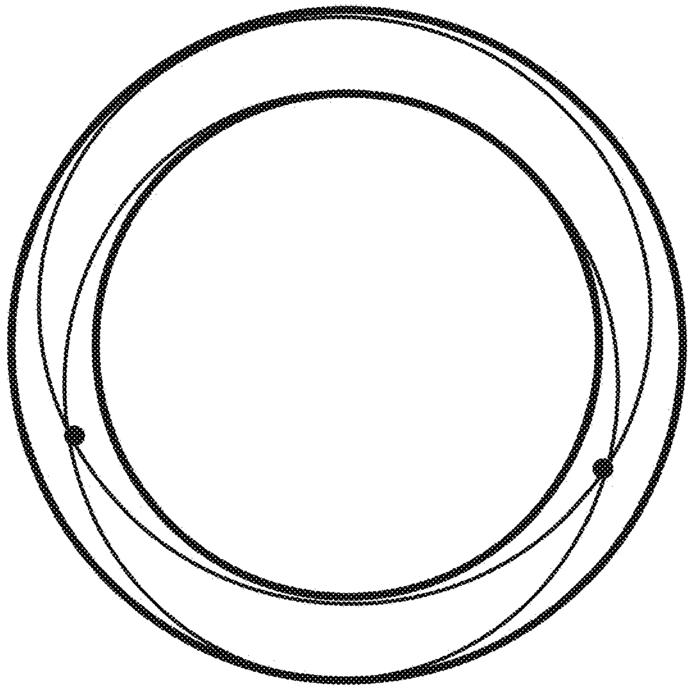

FIG. 20 shows a representation of bending of the linear form factor core from FIG. 19 into a toroid form factor.

Figure 21:
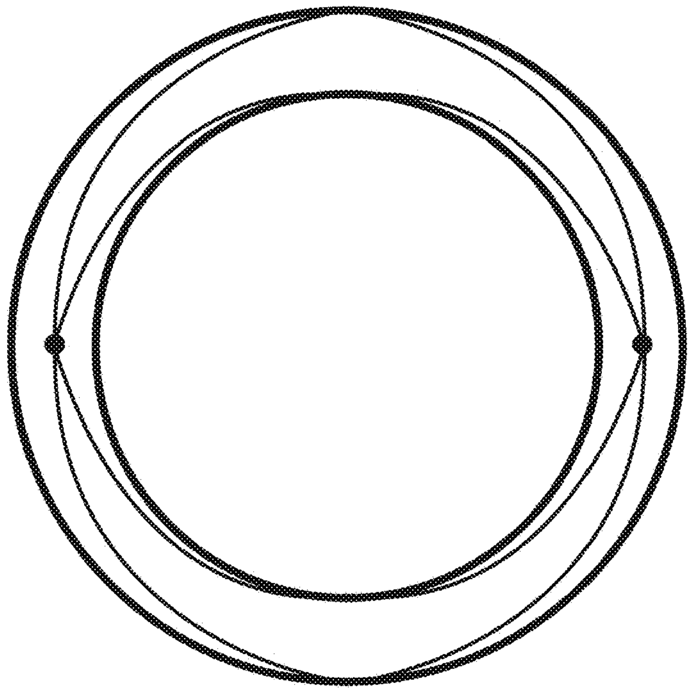

FIG. 21 shows a representation of the realignment of the nodal points, and there are still two waves formed inside the lattice structure of the toroid—one across the top and one across the bottom.

FIG. 22 shows a table of results of an experiment performed at a frequency of 2,097 Hz to determine inductance, resistance, and capacitance values for the windings in inductors of parallel inductor systems.

DETAILED DESCRIPTION

Embodiments of the subject invention provide novel and advantageous systems and methods for amplifying power, voltage, and/or current. A system can include one or more inductors (e.g., a single-inductor system or a parallel inductor system), each inductor including a magnetic core, a primary winding, and a secondary winding. The secondary winding can include two or more secondary winding wires (which may also be referred to herein as "secondary windings"), and the secondary winding wires can be connected to each other by a connection wire (see 400 in FIG. 4); for example, the connection wire can connect to a first secondary winding wire at a first end of the inductor and to a secondary winding wire at a second end of the inductor opposite from the first end. In the case where the system includes two parallel inductors, the secondary winding wires of a first inductor can be connected to each other and/or to the secondary winding wires of a second inductor with connection wires (see, e.g., FIGS. 5A, 5B, 5C, 5D, 5E, 5F, 5G, 5H, and 5I).

Figure 1:
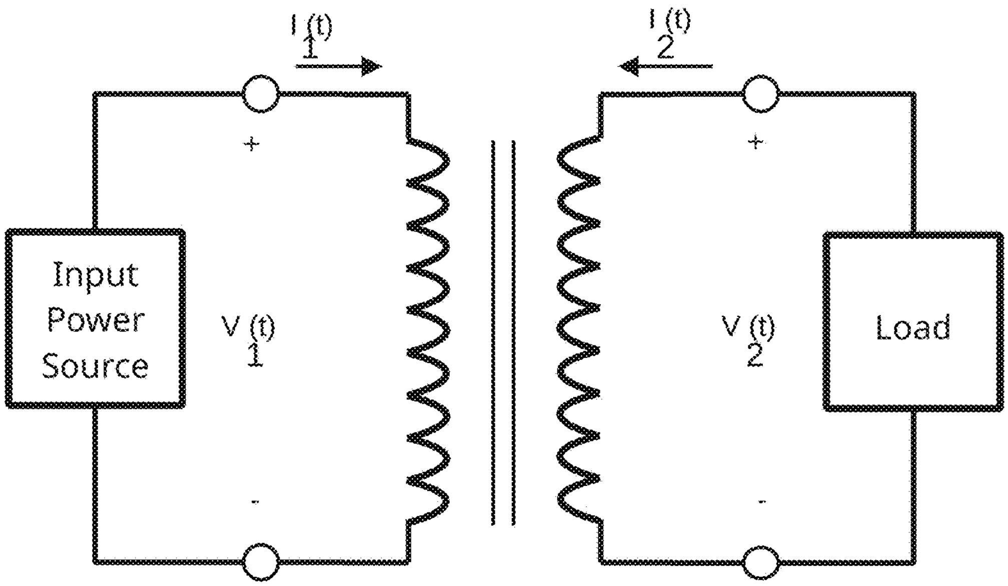
FIG. 1 (Prior Art)
FIG. 1 is a schematic representation of a prior art coupled inductor.
Figure 2:
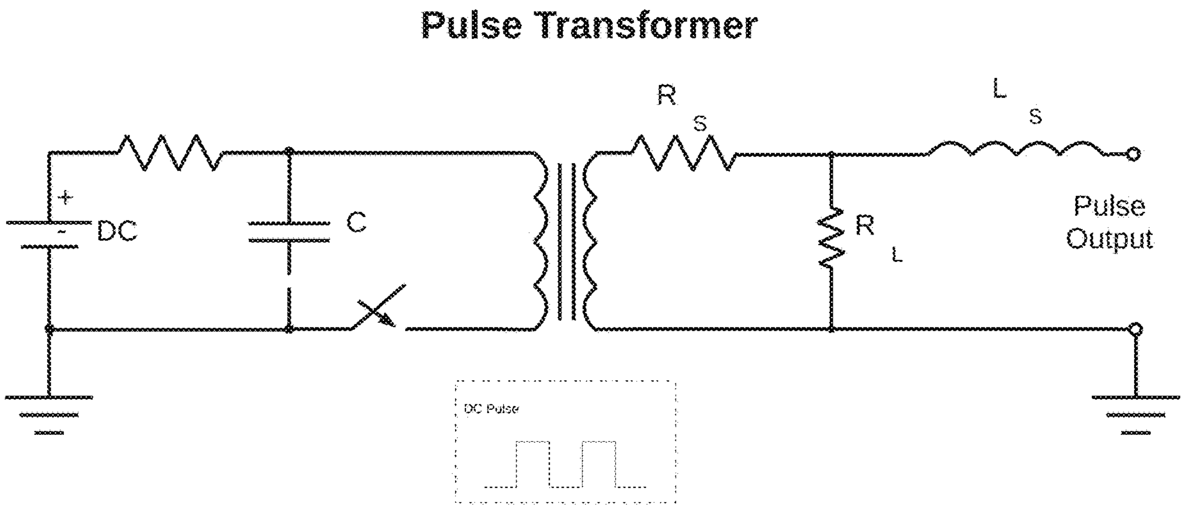
FIG.2 (Prior Art)
FIG. 2 is a schematic representation of a direct current (DC) to pulsed DC converter, where a DC source such as a battery, capacitor, or solar panel is the input.
Figure 3A:
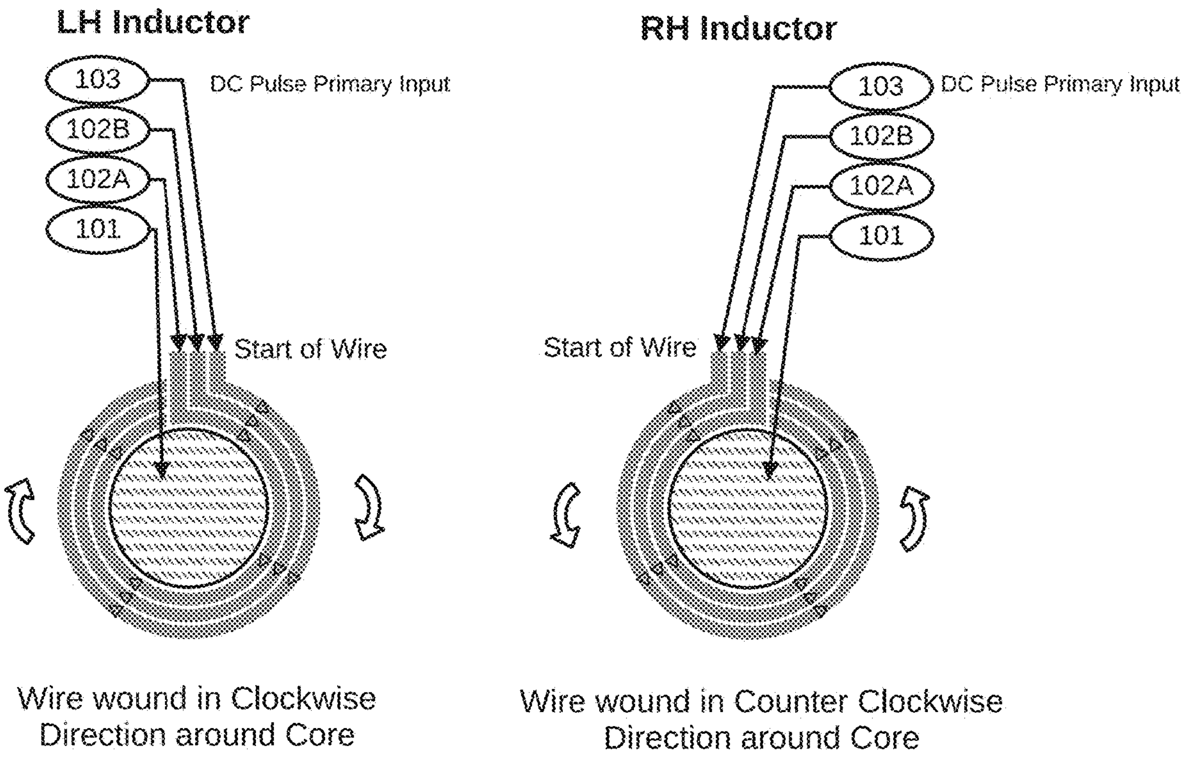
FIG. 3A is a cross-section of a device, according to an embodiment of the subject invention, showing the magnetic core 101, secondary winding 102A,102B, and primary winding 103. The winding in the clockwise and the counter clockwise direction can be seen in FIG. 3A.
Figure 3B:
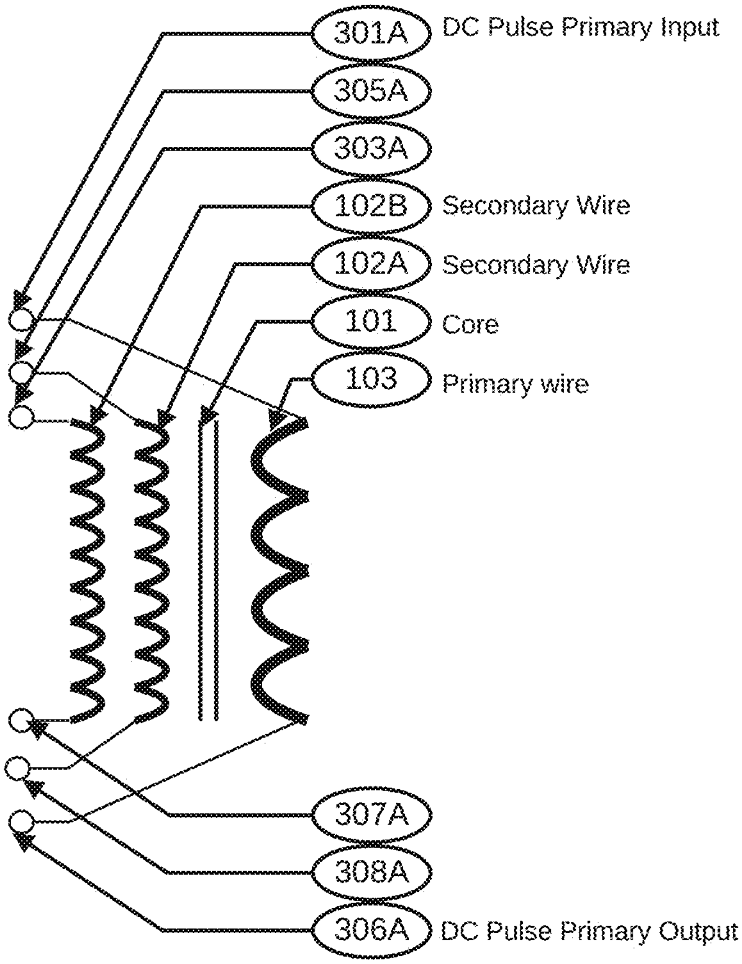
FIG. 3B is a schematic representation of the device of FIG. 3A, showing the magnetic core 101, secondary winding 102A,102B, and primary winding 103. Reference numerals 301A, 303A, 305A, 306A, 307A, and 308A are connection points of the primary winding 101 and the secondary winding 102A,102B.
Figure 4:
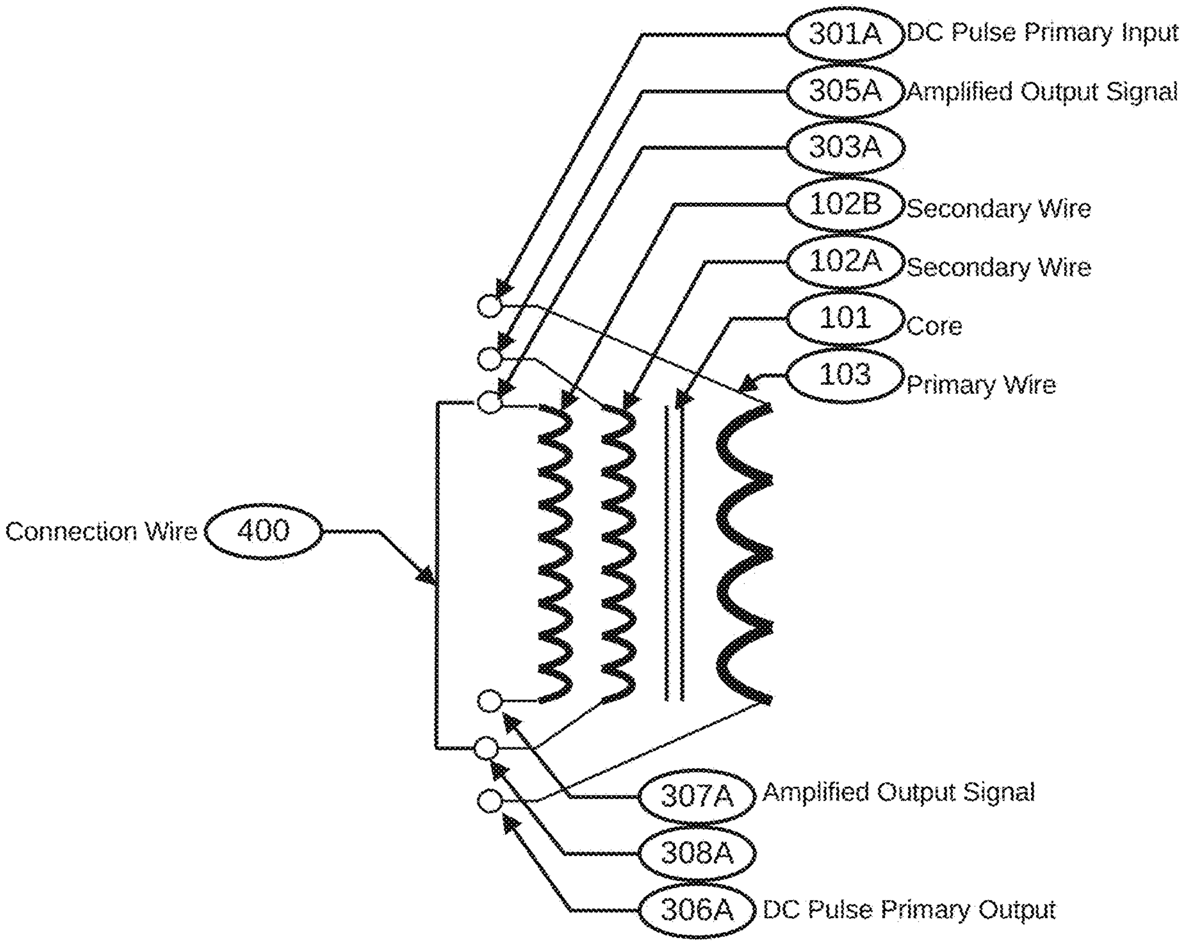
FIG. 4 is a schematic representation of the inductor from FIG. 3B, with the secondary winding wires 102A and 102B connected with wire 400 at nodes 303A and 308A. The magnetic core 101, secondary winding including wires 102A and 102B, and primary winding 103 are shown. The primary winding power input is 301A (where the input to the system (DC pulse input) can be provided), and the primary winding power output is 306A. The outputs of the secondary winding wires 102A and 102B are shown as 305A and 307A, respectively, and these can be where the amplified output signal (which can be a DC pulse) is collected.

FIGS. 3A and 3B show a cross-section and a schematic view, respectively, of an inductor according to an embodiment of the subject invention, showing the magnetic core 101, secondary winding 102A,102B, and primary winding 103. The secondary winding can include two or more physically separate secondary winding wires. FIG. 4 shows the secondary winding wires 102A,102B connected to each other with connection wire 400. In particular, the connection wire can connect to the first secondary winding wire 102A at a first end of the inductor and to the secondary winding wire 102B at a second end of the inductor opposite from the first end. The primary power input can be where 301A is shown, and the primary power output can be where 306A is shown. The outputs of the secondary winding wires 102A, 102B are shown as 305A and 307A.

Figure 5A:
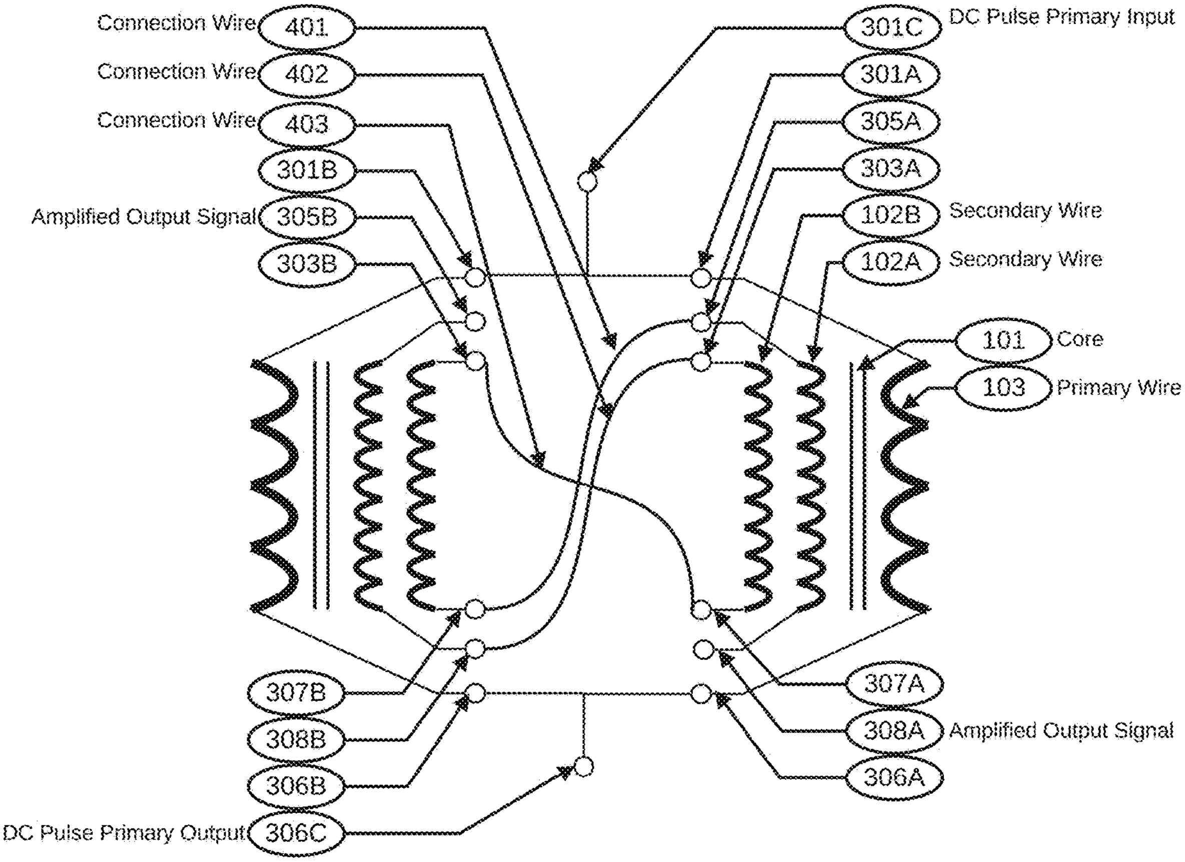
FIG. 5A is a schematic representation of a coupled system, according to an embodiment of the subject invention, showing an inductor from FIG. 3B connected to a similar inductor from FIG. 3B with the secondary winding wires interconnected via wires 401,402,403. The magnetic core 101, secondary winding 102A,102B, and primary winding 103 are shown. The primary winding power input is 301C (where the input to the system (DC pulse input) can be provided), and the primary winding output is 306C. The outputs of the secondary winding wires 102A,102B are shown as 305B and 308A, and these can be where the amplified output signal (which is a DC pulse) is collected. Reference numerals 303A, 303B, 305A, 305B, 307A, 307B, 308A, and 308B are connection points of the secondary winding wires 102A and 102B.
Figure 5B:
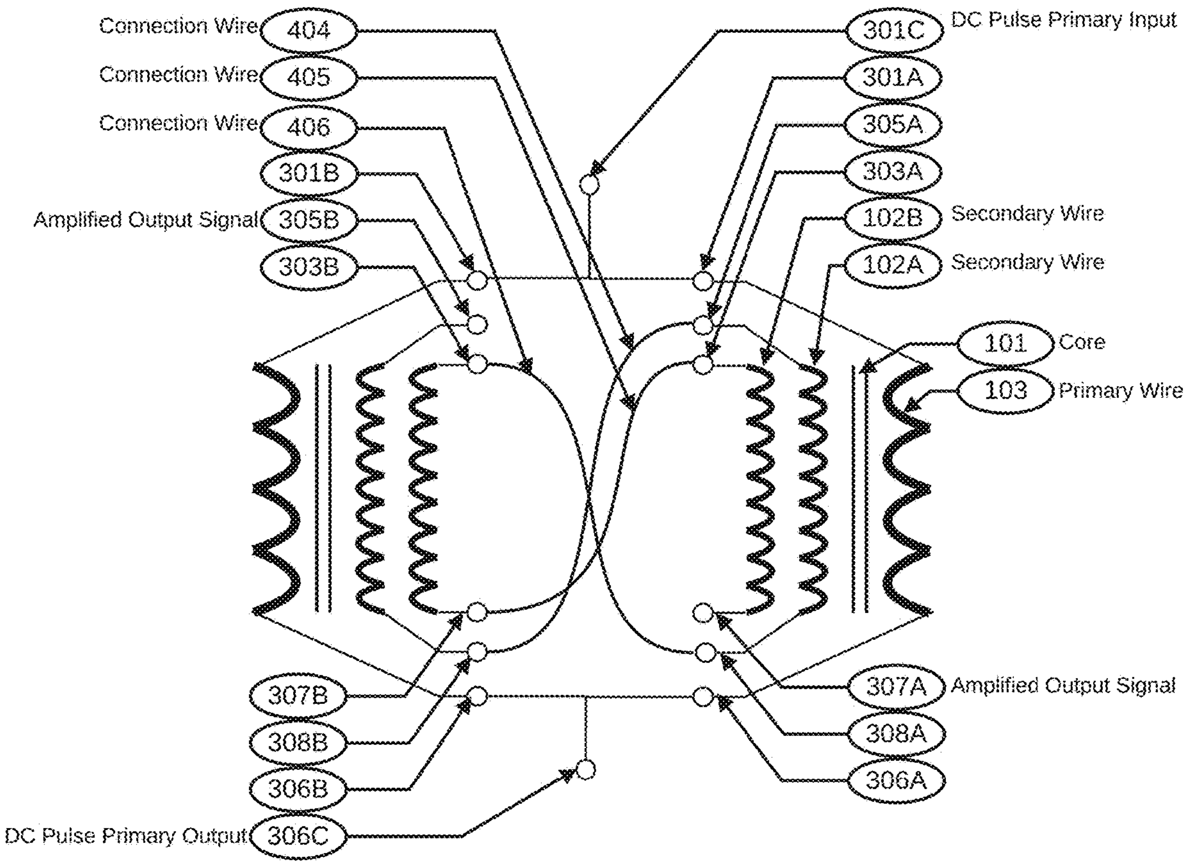
FIG. 5B shows a system according to an embodiment of the subject invention, similar to FIG. 5A but with alternative connections 404,405,406 between the secondary winding wires of the two coupled inductors. The outputs of the secondary winding wires 102A,102B are shown as 305B and 307A, respectively, and these are where the amplified output signal (which is a DC pulse) is collected.
Figure 5C:
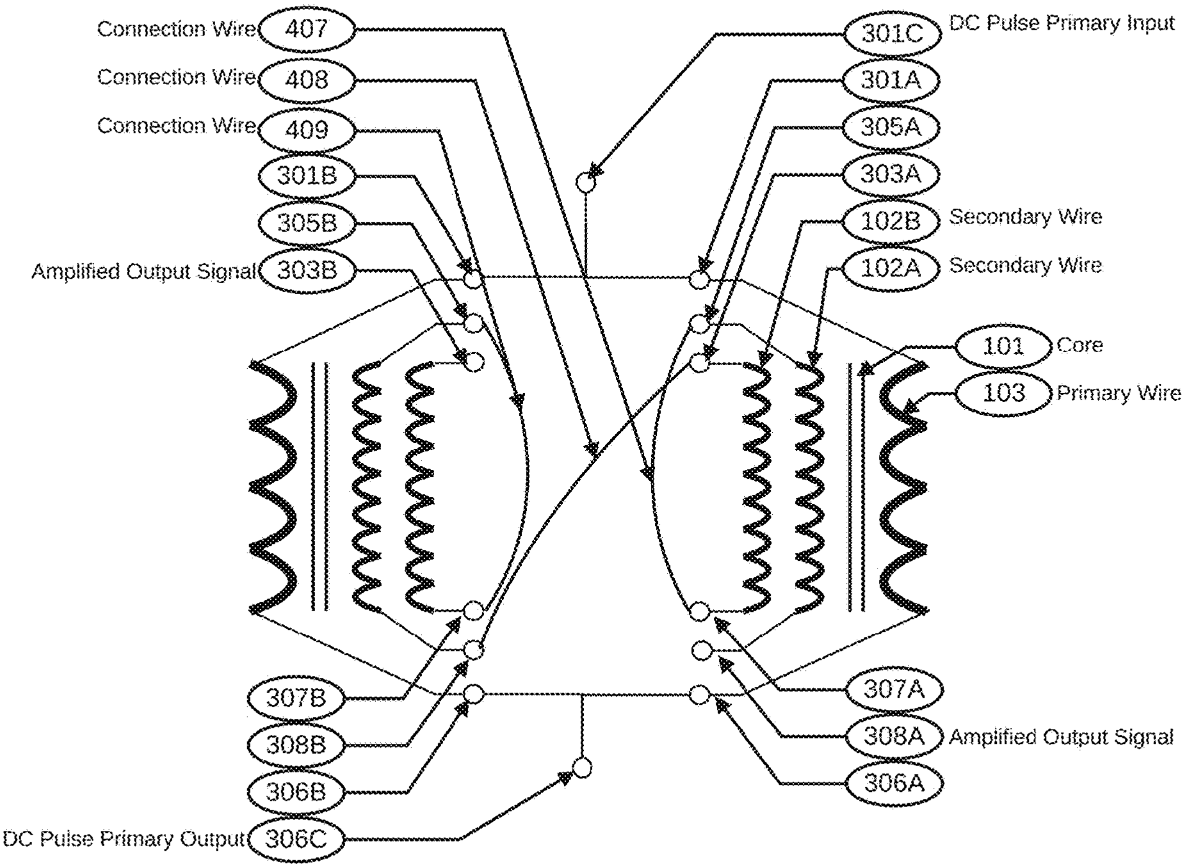
FIG. 5C shows a system according to an embodiment of the subject invention, similar to FIGS. 5A and 5B but with alternative connections 407,408,409 between the secondary winding wires of the two coupled inductors. The outputs of the secondary winding wires 102A,102B are shown as 303B and 308A, respectively, and these are where the amplified output signal (which is a DC pulse) is collected.
Figure 5D:
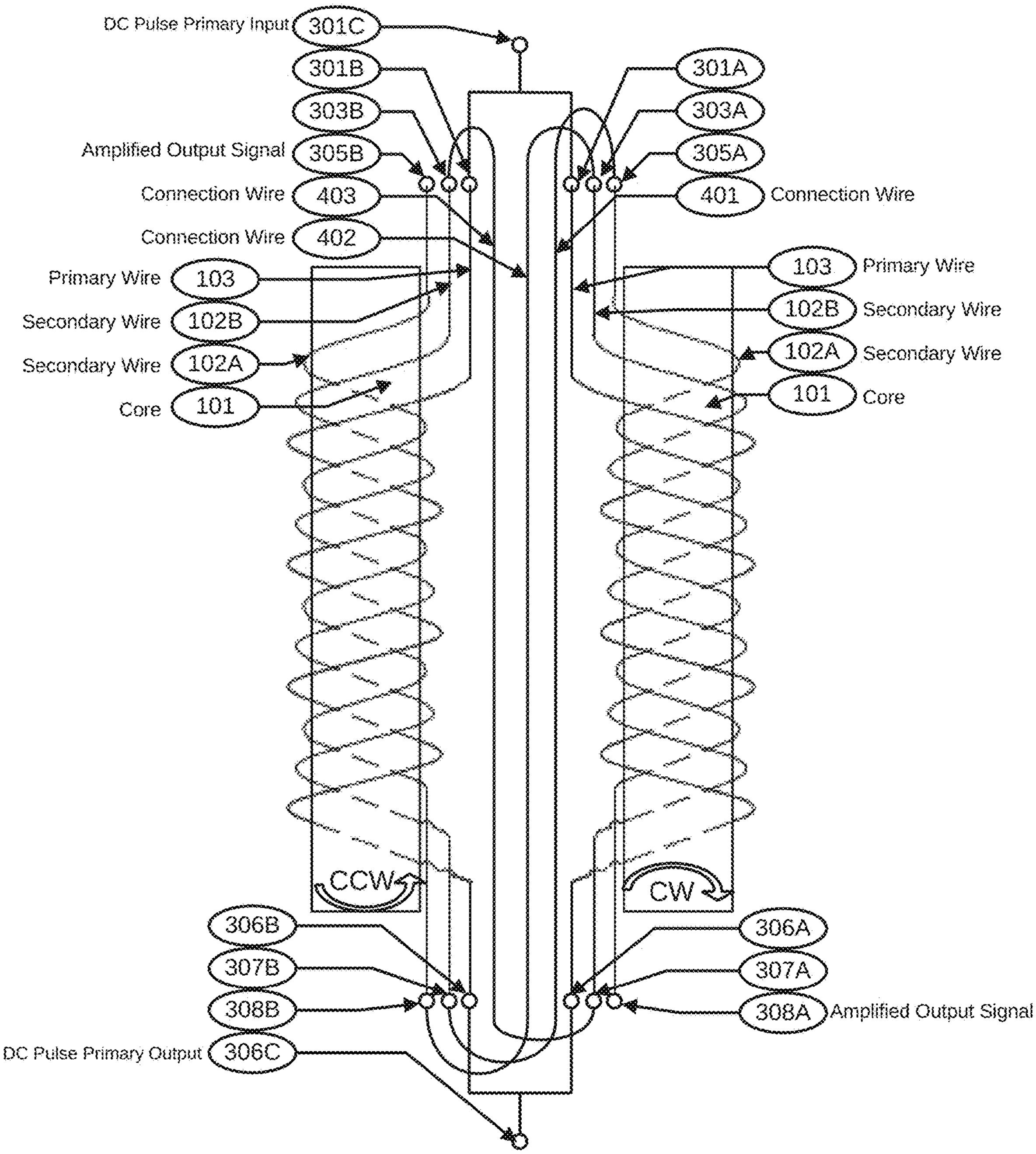
FIG. 5D is a physical representation of a device, according to an embodiment of the subject invention, having a linear form factor. The connections in FIG. 5D are the same as those in FIG. 5A.
Figure 5E:
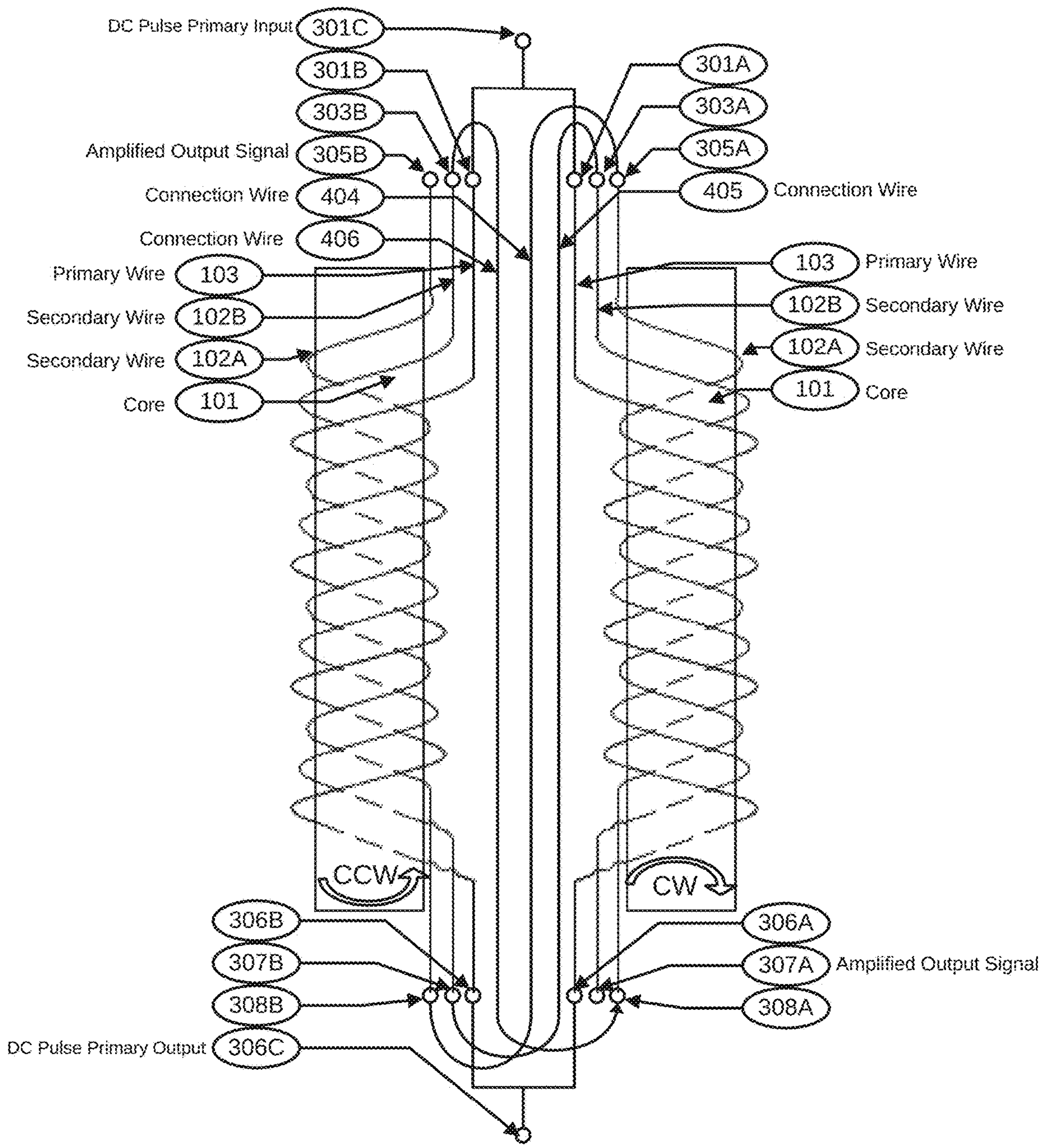
FIG. 5E is a physical representation of a device, according to an embodiment of the subject invention, having a linear form factor. The connections in FIG. 5E are the same as those in FIG. 5B.
Figure 5F:
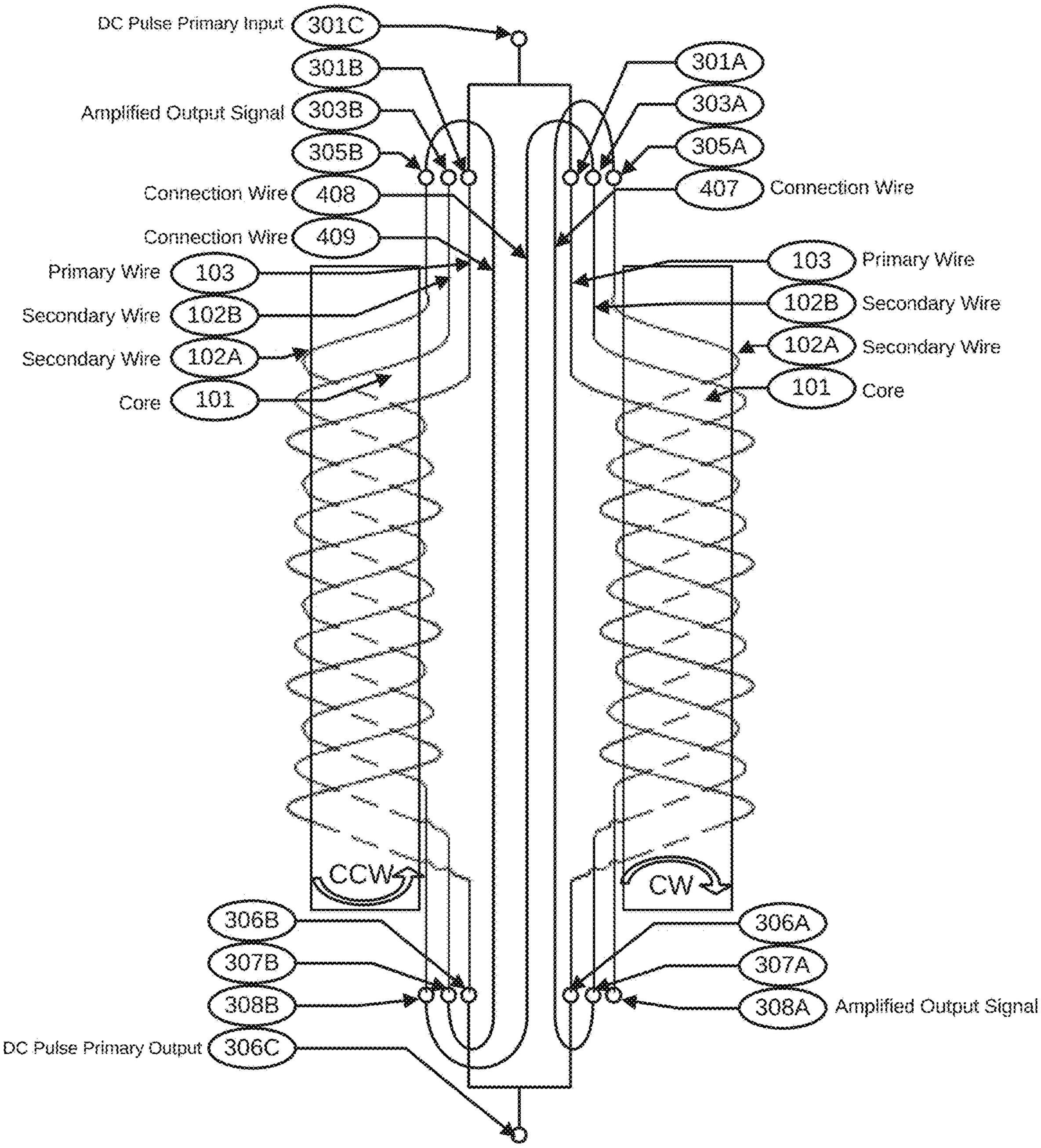
FIG. 5F is a physical representation of a device, according to an embodiment of the subject invention, having a linear form factor. The connections in FIG. 5F are the same as those in FIG. 5C.
Figure 5G:
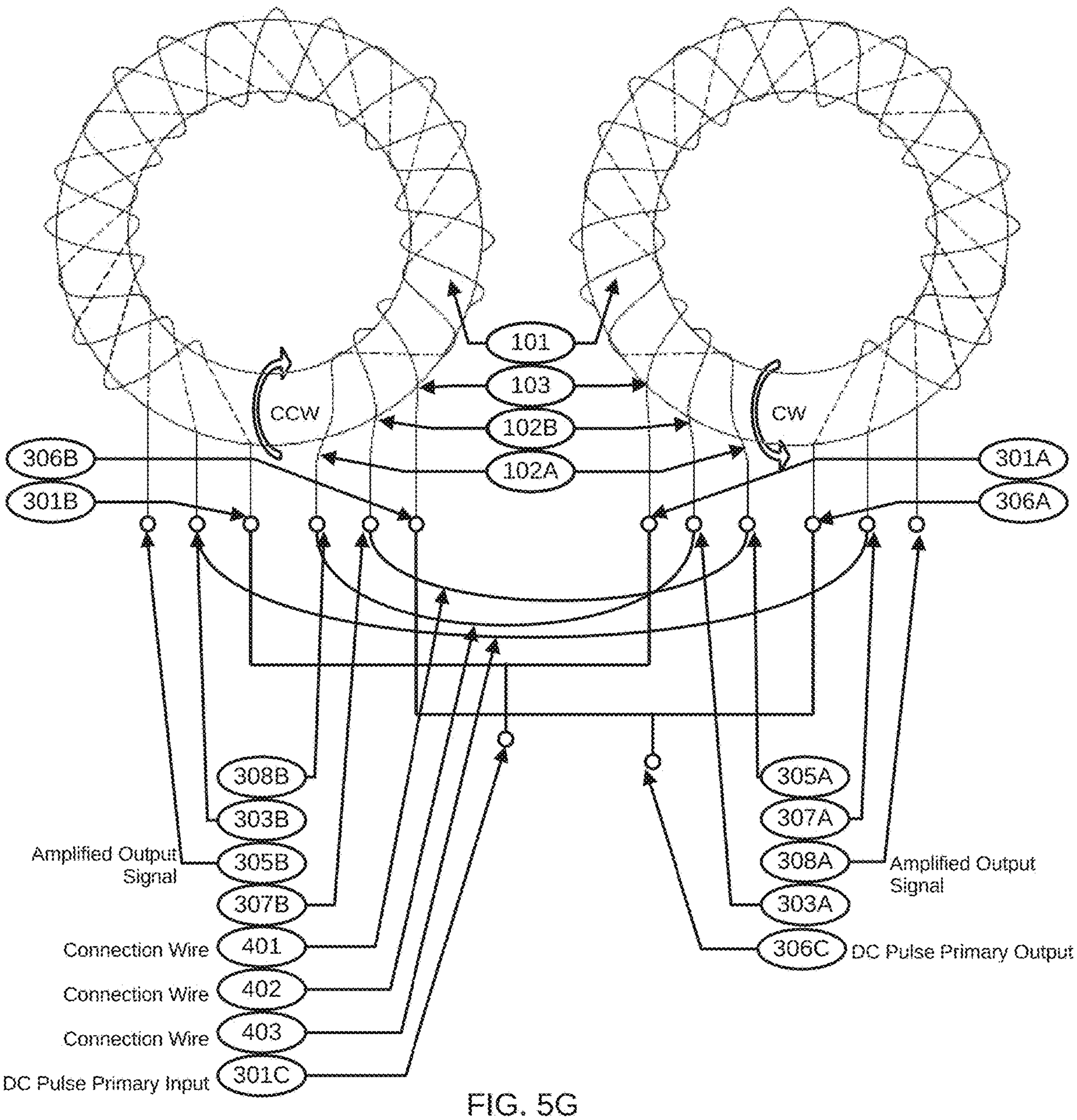
FIG. 5G is a physical representation of a device, according to an embodiment of the subject invention, having a toroid form factor. The connections in FIG. 5G are the same as those in FIG. 5A.
Figure 5H:
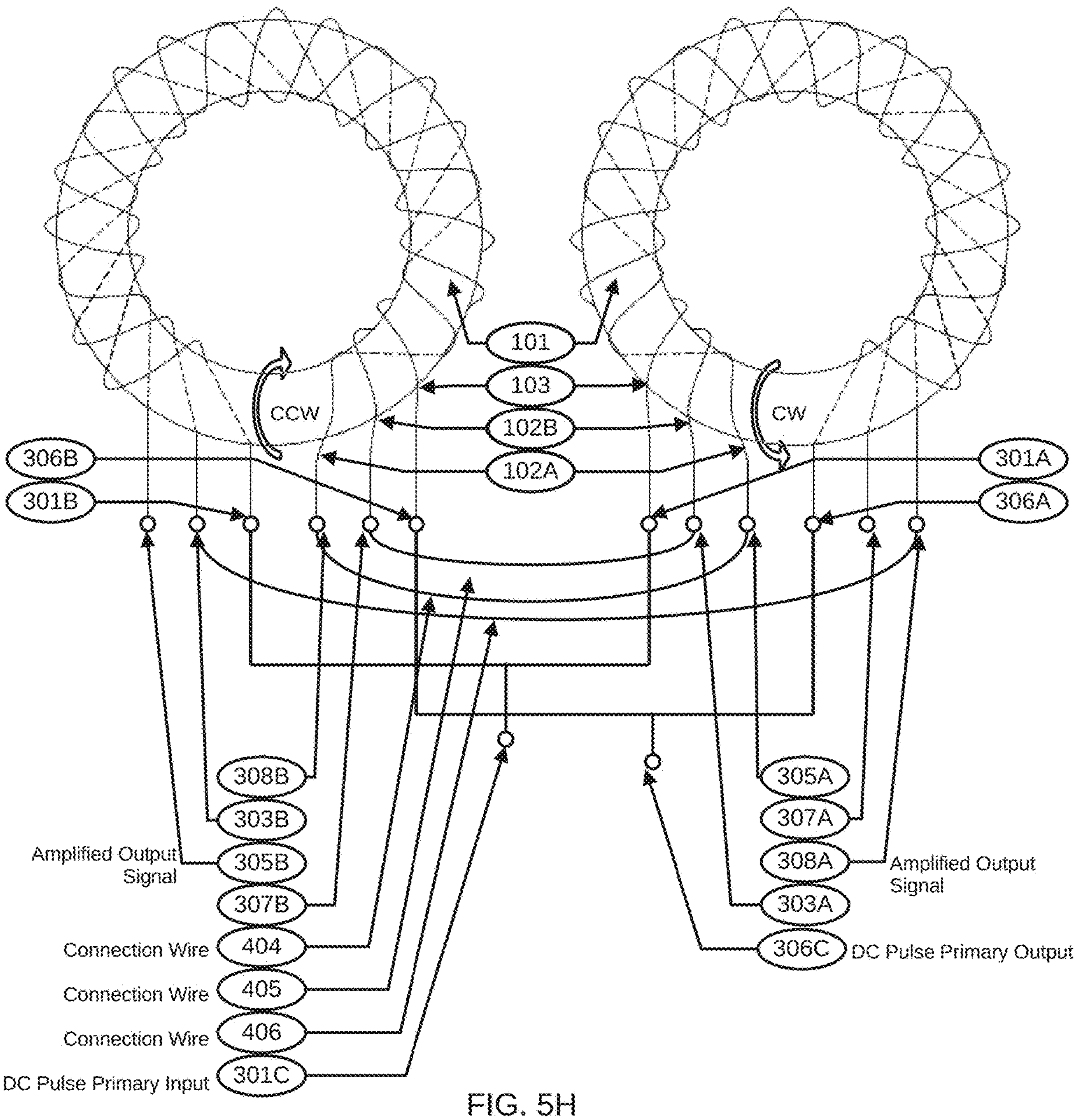
FIG. 5H is a physical representation of a device, according to an embodiment of the subject invention, having a toroid form factor. The connections in FIG. 5H are the same as those in FIG. 5B.
Figure 5I:
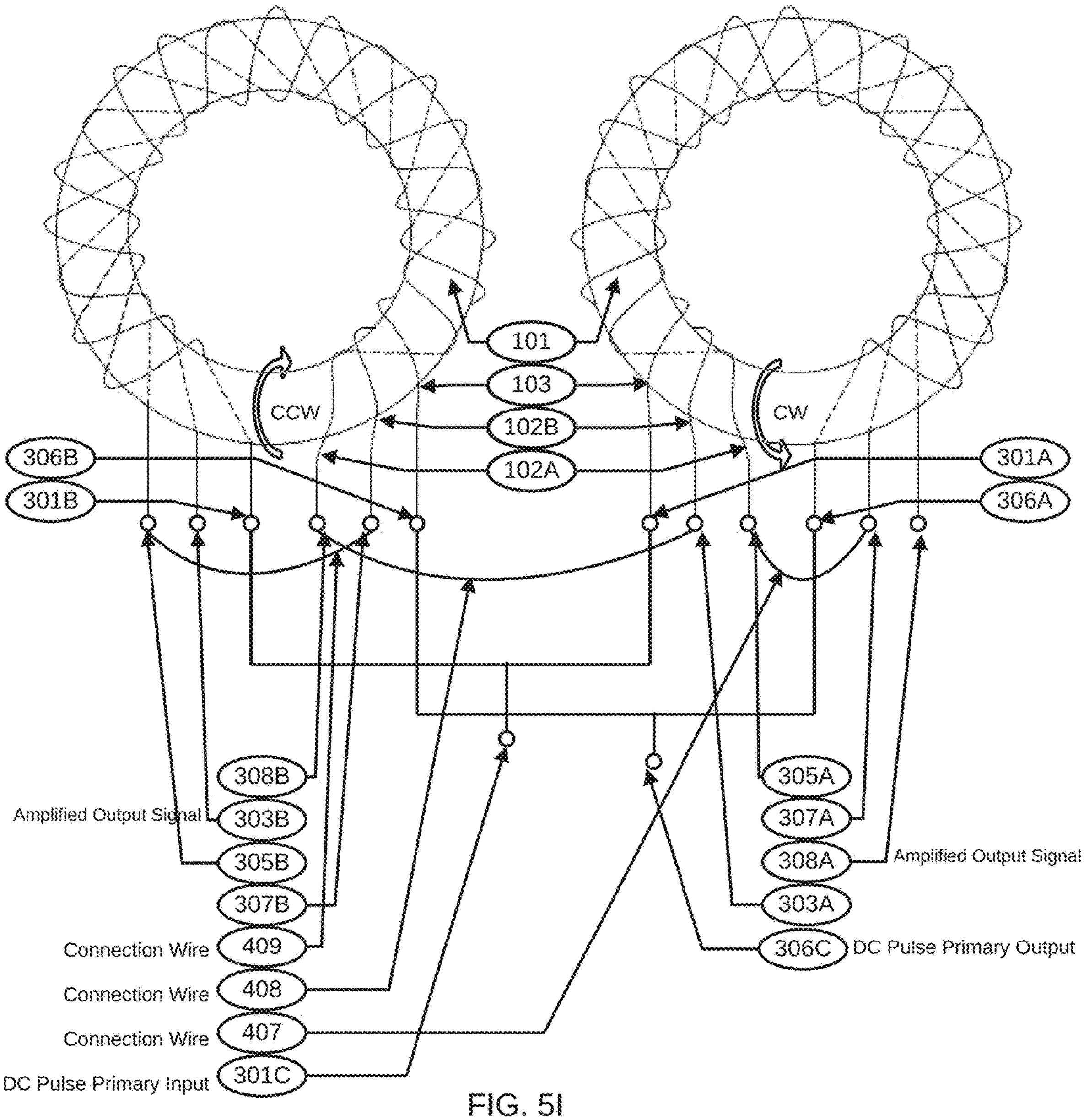
FIG. 5I is a physical representation of a device, according to an embodiment of the subject invention, having a toroid form factor. The connections in FIG. 5I are the same as those in FIG. 5C.

FIGS. 5A, 5B, and 5C show schematic representations of coupled systems (or parallel inductor systems), according to embodiments of the subject invention. Each parallel system shows an inductor (from FIG. 3B) connected to a similar inductor with the secondary winding wires interconnected via connection wires (401,402,403 in FIG. 5A; 404,405,406 in FIG. 5B; and 407,408,409 in FIG. 5C). There are multiple additional ways to interconnect the secondary windings, and the configurations shown in FIGS. 5A, 5B, and 5C are shown for exemplary purposes only and should not be construed as limiting. The primary winding power input can be where the reference numeral 301C is shown, and the primary winding power output can be where the reference numeral 306C is shown. The outputs of the secondary winding wires are shown as 305B and 308A in FIG. 5A, 305B and 307A in FIG. 5B, and 303B and 308A in FIG. 5C. The input signal (e.g., a direct current (DC) pulse) can be provided to the primary winding power input 301C, and the amplified output signal (e.g., a DC pulse) can be collected at the outputs of the secondary winding wires. In other configurations different from those shown in FIGS. 5A, 5B, and 5C, the output nodes of the secondary winding wires may be located differently, but the amplified output signal can be collected between nodes respectively located at ends of one or more of the secondary winding wires (e.g., between two nodes located at ends of two secondary winding wires).

Figure 6A:
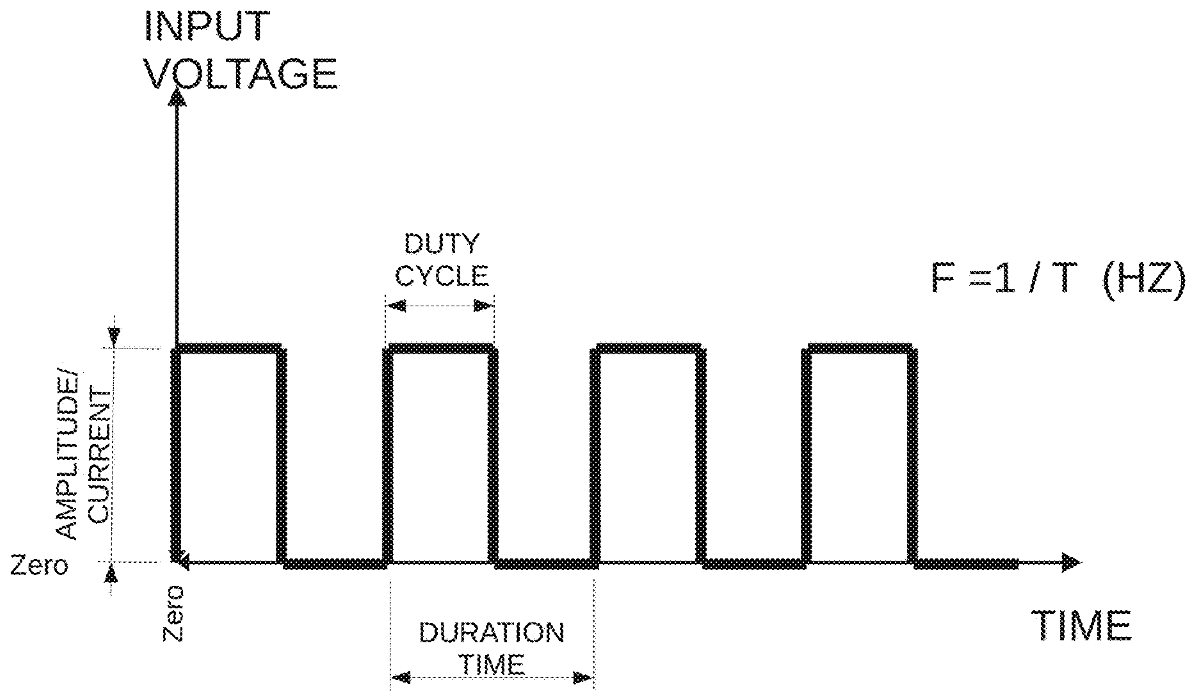
FIG. 6A shows the input DC pulse that can be applied to 301A (see also FIGS. 3B, 3C, 3E, 3F, 4) and 301C shown in FIGS. 5A, 5B, 5C, 5D, 5E, 5F, 5G, 5H, and/or 5I.
Figure 6B:
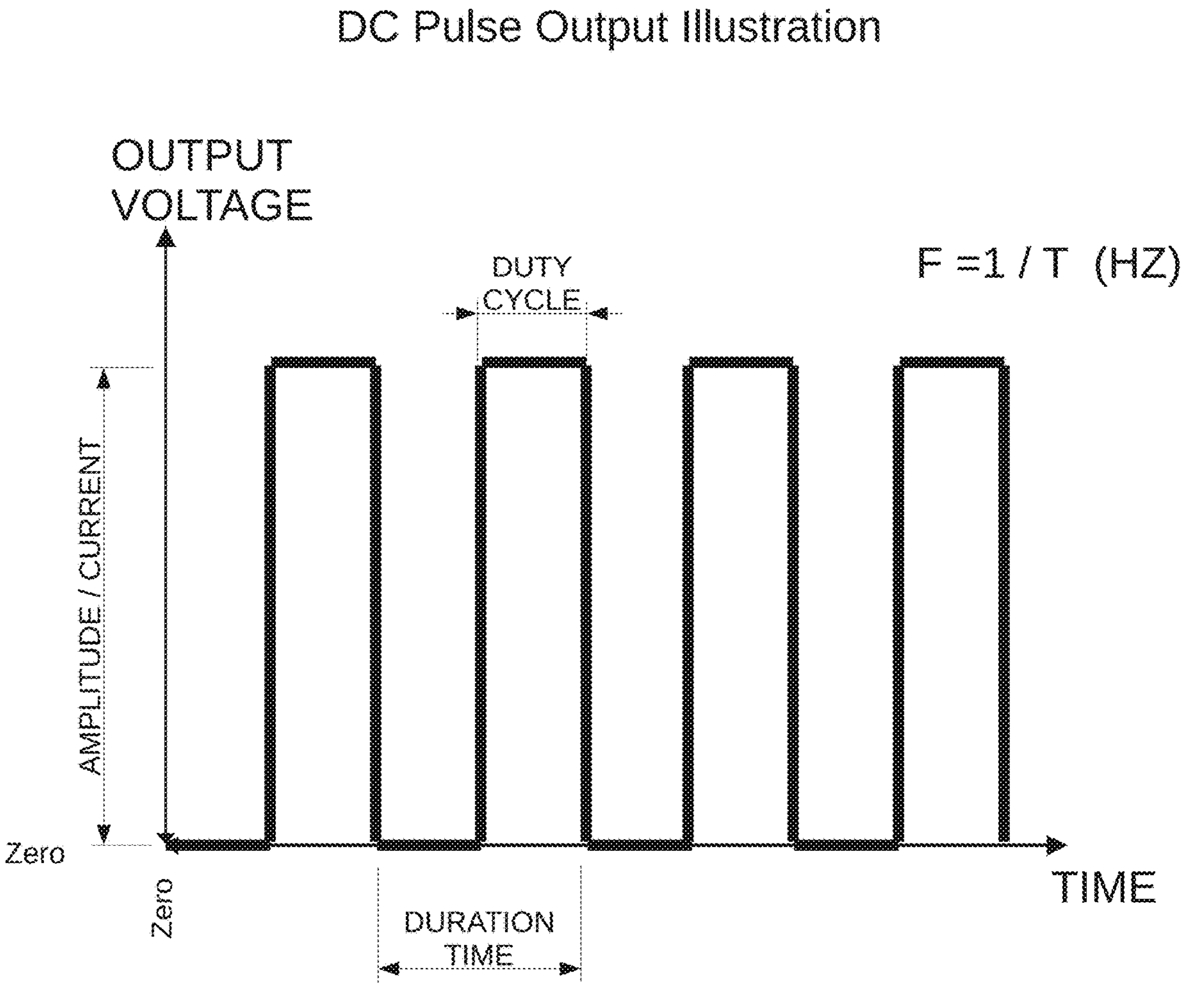
FIG. 6B shows the output DC pulse that is output between 305A and 307A in FIG. 4 and between 305B and 308A in FIGS. 5A, 5D, and 5G, 305B and 307A in FIGS. 5B, 5E, and 5H, and 303B and 308A in FIGS. 5C, 5F, and 5I.

FIG. 6A shows an input DC pulse that can be applied to 301A and 301C shown in FIGS. 4, 5A, 5B, and/or 5C. Pulsed DC creates periodic current that changes in value between 0 and a maximum positive value but never changes direction. The duty cycle of the DC pulse can be set at any value (e.g., 1% to 99% or any value or subrange there between). For example, a 50% duty cycle can be used to optimize system performance and simplify the equations and rectification process.

In many embodiments, the magnetic core 101 of the (or each) inductor comprises a permeable (e.g., a highly permeable) magnetic metal material that is able to hold a significant amount of magnetic saturated flux. The magnetic flux density will vary based on core composition, wiring, and connection methodology. In some embodiments, the core can consist entirely of the permeable (e.g., a highly permeable) magnetic metal material (e.g., iron or an iron alloy). The composition, shape, length, and/or diameter of the core can vary and will change the performance of the system. Any reasonable composition, shape, length, and/or diameter of the core can be used with embodiments of the subject invention. The core can have a linear, toroid (circular; see also FIGS. 20-21), or other form factor. FIGS. 3E, 5D, 5E, 5F and 19 show examples of a linear form factor; and FIGS. 3F, 5G, 5H, 5I, 20, and 21 show examples of a toroid form factor.

Figure 3C:
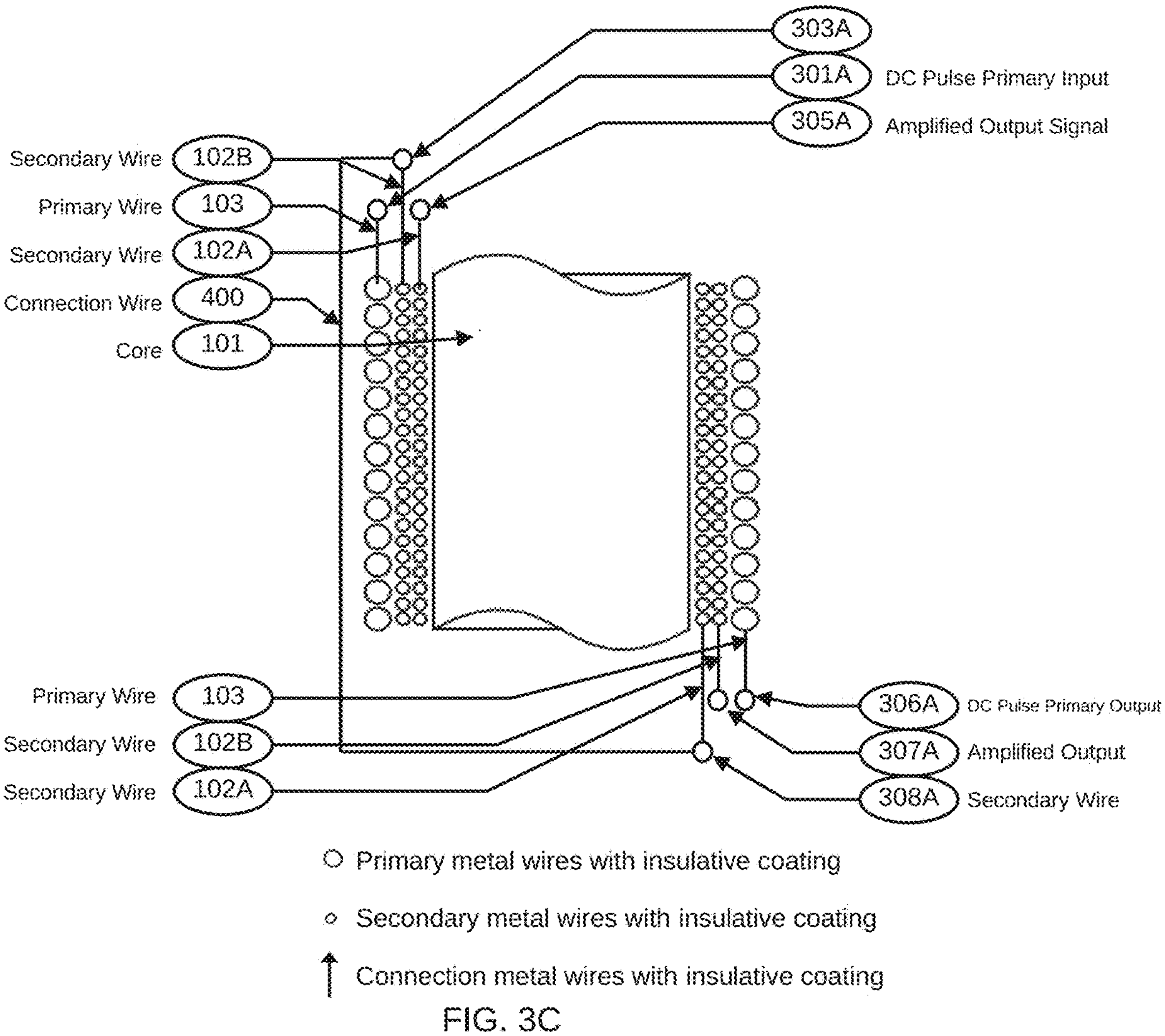
FIG. 3C is a cross-section of a device, according to an embodiment of the subject invention, showing the magnetic core 101, secondary windings 102A,102B, and primary winding 103.
Figure 3D:
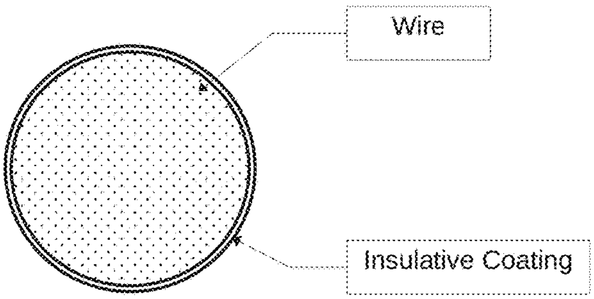
FIG. 3D is a cross-section of a wire showing insulative coating. This type of wire with insulative coating can be used for any or all of the primary winding(s), the secondary windings, and the connection wires.
Figure 3E:
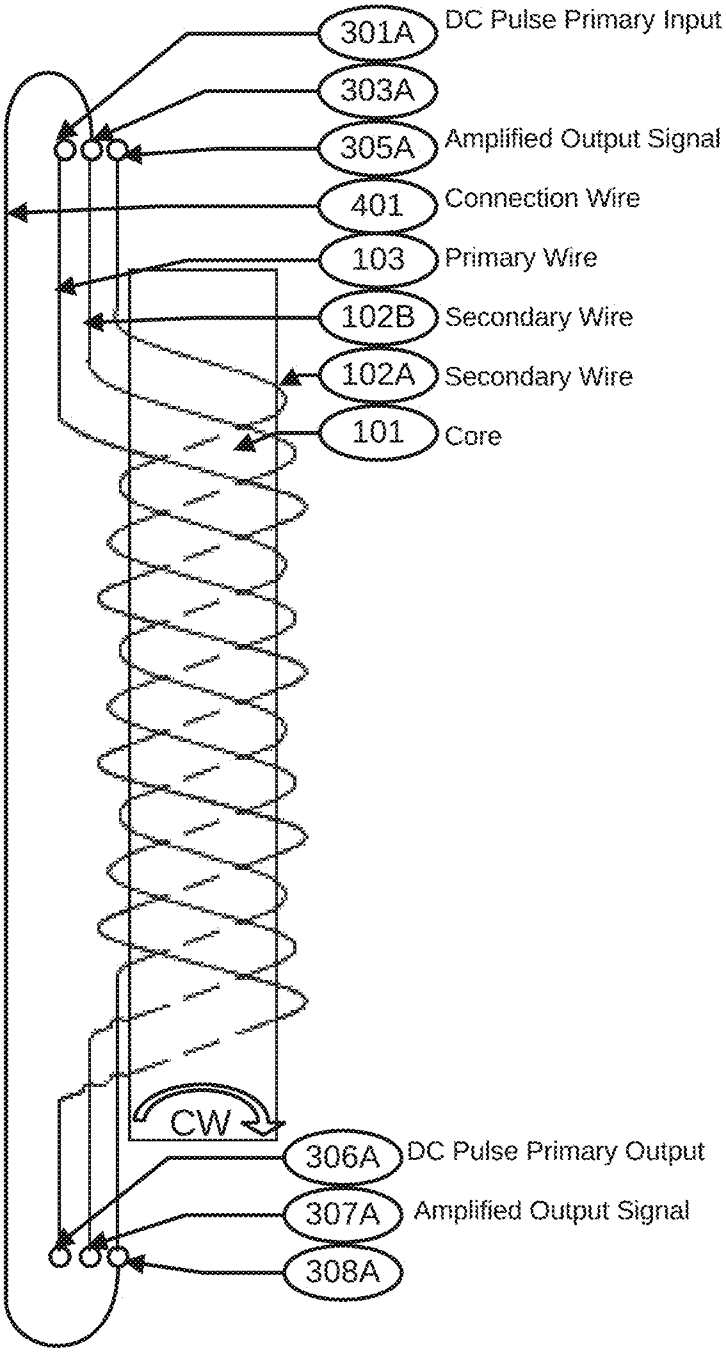
FIG. 3E is a physical representation of a device, according to an embodiment of the subject invention, having a linear form factor.
Figure 3F:
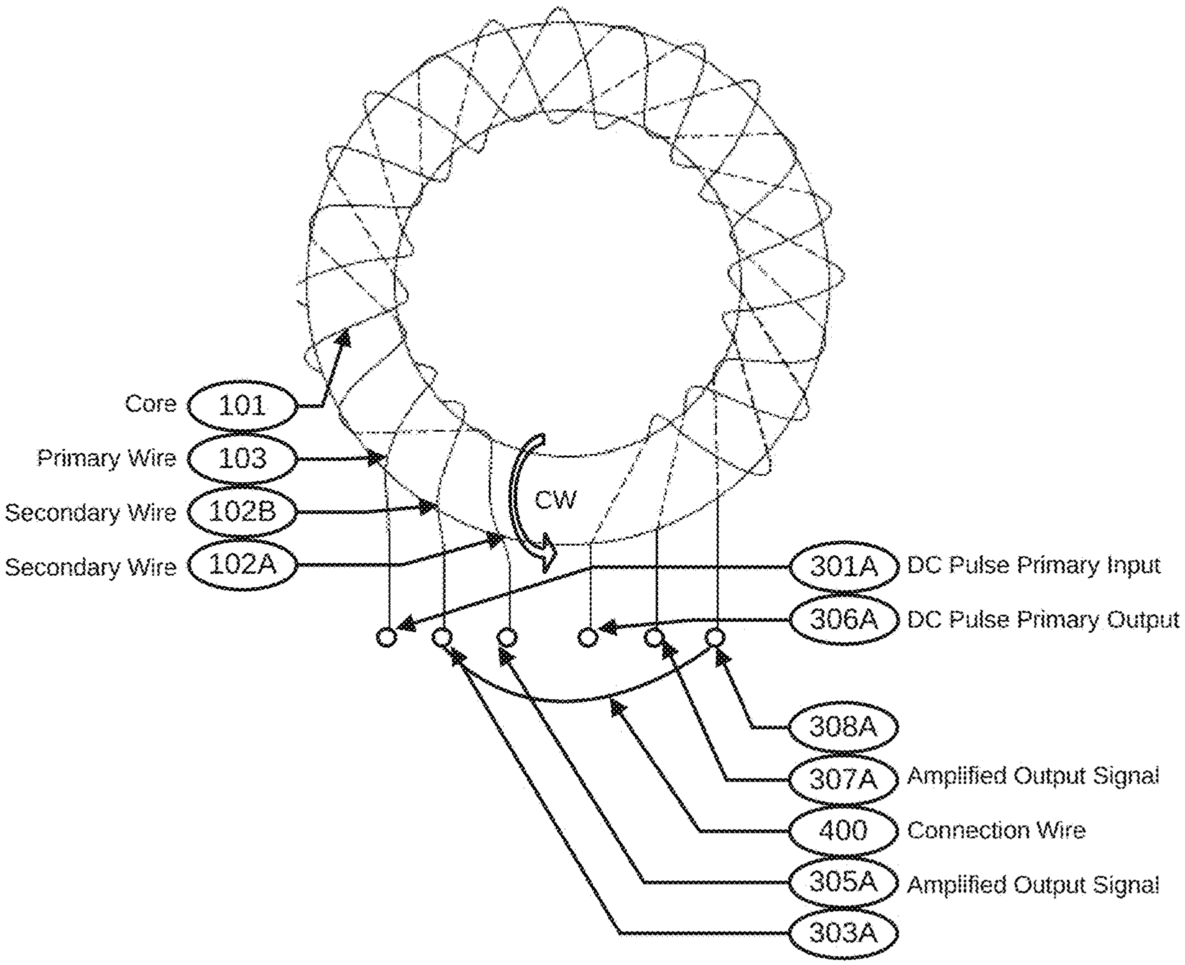
FIG. 3F is a physical representation of a device, according to an embodiment of the subject invention, having a toroid form factor.

The primary winding 103, the secondary winding 102A, 102B, and/or the connection wires 400,401,402,403,404,405,406,407,408,409 can be a metal material (e.g., copper) with an insulative coating (see also, e.g., FIG. 3D). The connection wires 400,401,402,403,404,405,406,407,408,409 can have the same wire diameter as each other, all can have different wire diameters from each other, or some can have the same wire diameter as each other while others have different wire diameters. Similarly, the connection wires 400,401,402,403,404,405,406,407,408,409 can have the same wire area as each other, all can have different wire areas from each other, or some can have the same wire area as each other while others have different wire areas.

Figure 10A:
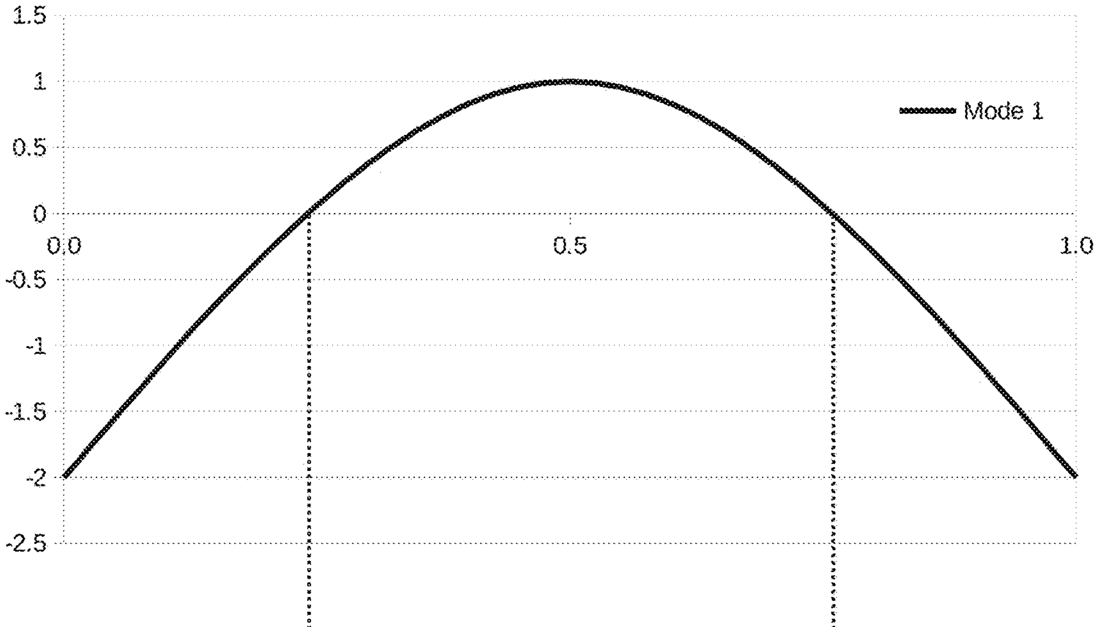
FIG. 10A shows a graph of the stated Bernoulli-Euler equation for iron/steel.
Figure 10B:
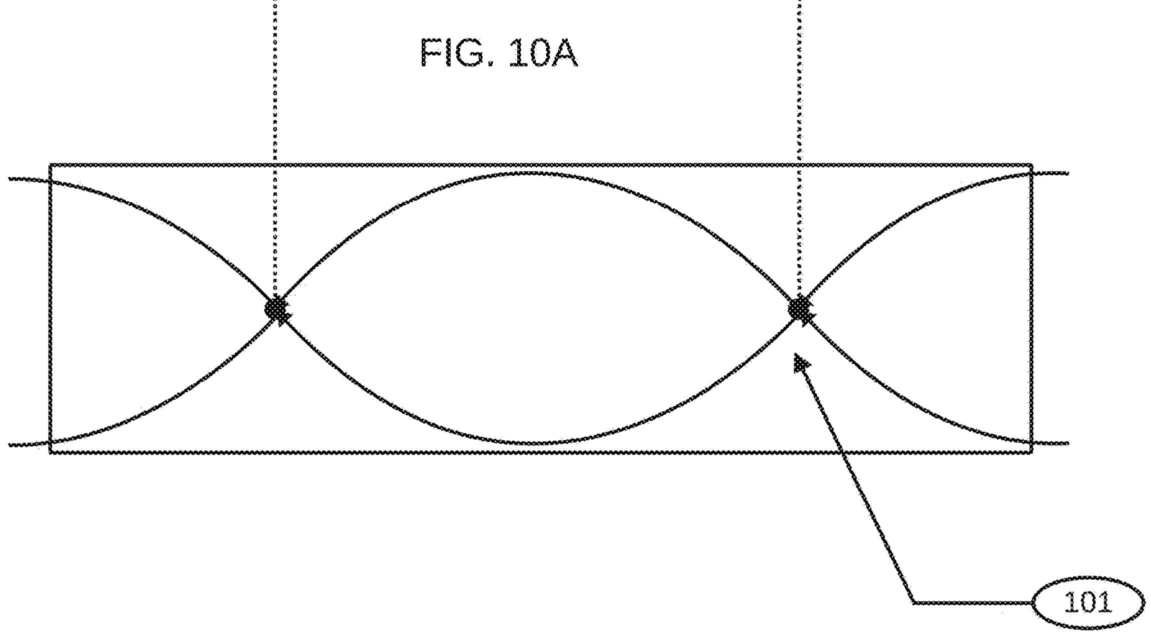
FIG. 10B shows the wave form superimposed on the core.

The secondary winding 102A,102B can be wrapped around the core 101, and the primary winding 103 can be wrapped around the secondary winding 102A,102B and the core 101. The secondary winding wires 102A,102B can be wrapped such that they are next to each other along the length of the core 101 (e.g., such that both secondary winding wires are wrapped directly around the core 101) or such that one covers the other (i.e., such that one secondary winding wire is disposed farther from the core than is the other secondary winding wire). All windings within an inductor can be wrapped in the same direction as each other. That is, the primary winding 103 and all secondary windings 102A,102B can be wrapped around the core in the same direction as each other (e.g., clockwise or counterclockwise). The primary winding 103 and/or the secondary winding 102A,102B can extend past the nodes of the core 101 (e.g., as shown in FIGS. 10A, 10B, and 19 for iron/steel), and should be constructed to share the same capacitive field created between windings (i.e., the core, the primary winding, and the secondary windings of the same inductor can all be disposed within the same capacitive field as each other).

In the parallel inductor system (linear, toroid, or any other form factor), the primary winding 103 and all secondary windings 102A,102B can be wrapped around the core in the same direction as each other (e.g., clockwise or counterclockwise) in the first inductor of the system, and the primary winding 103 and all secondary windings 102A, 102B can be wrapped around the core in the same direction as each other (e.g., clockwise or counterclockwise) in the second inductor of the system. The direction in which the windings in the first inductor are wrapped must be different from the direction in which the windings in the second inductor are wrapped. For example, if all windings in the first inductor are wrapped around the core in a clockwise direction, all windings in the second inductor will be wrapped around the core in a counterclockwise direction. In addition, in the parallel inductor system, the two inductors can be positioned in any way with respect to each other. The magnetic core of each inductor should be disposed in its respective individual capacitive field with its respective primary winding and respective secondary windings (i.e., the magnetic core of the first inductor is disposed in its individual capacitive field with the primary winding of the first inductor and the secondary windings of the first inductor, and the second inductor is disposed in its individual capacitive field with the primary winding of the second inductor and the secondary windings of the second inductor).

When the DC pulse input signal is applied, the core 101 has a north pole (or "north end") and a south pole (or "south end"). In the single inductor system (as shown in FIG. 4), the input signal can be applied to the end of the primary winding 103 disposed at the north pole of the core 101 or the end of the primary winding 103 disposed at the south pole of the core 101. In the parallel inductor system (as shown for example in FIGS. 5A-5I), the input signal should be applied to the end of the end of the primary winding 103 (i.e., a first primary winding) disposed at the north pole of the core 101 (i.e., a first core) in one of the inductors and to the end of the primary winding 103 (i.e., a second primary winding) disposed at the south pole of the core 101 (i.e., a second core) in the other inductor.

Systems and methods of embodiments of the subject invention utilize two or more secondary windings wrapped around the core of the (or each, in the case of the parallel system) inductor. In addition, the input to the (or each, in the case of the parallel system) inductor is a DC pulse (i.e., a DC pulsed input), as opposed to an alternative current (AC) input as is typical for inductors. These features (two or more secondary windings; DC pulsed input) lead to the input and the output of the system being in different time domains, and they also lead to the creation of what is referred to herein as a longitudinal magnetic wave (or a longitudinal wave) up and down the core of the (or each, in the case of the parallel system) inductor.

When a core is excited with a coil in an inductor, the magnetism created in the core is equal to or less than what was used to excite it. Systems and methods of embodiments of the subject invention create the longitudinal magnetic wave up and down the core, so there is an added effect of magnetic movement. This leads to greatly amplified voltage, current, and/or power compared to the input DC signal. Systems and methods of embodiments of the subject invention can use resonant magnetic waves in the core. Due to the amplified output, a multiple secondary wires may be used to ensure the amplified output signal can be accommodated.

In many embodiments, the core is comprised entirely or mostly of iron or an iron alloy. If an iron alloy is used, any other metals in the alloy can have the same body centered cubic (BCC) crystalline structure as iron. When the core is comprised entirely or mostly of iron (or an iron alloy in which any other metals have the same BCC crystalline structure as iron), the presence of the longitudinal magnetic wave can be formed.

Figure 7A:
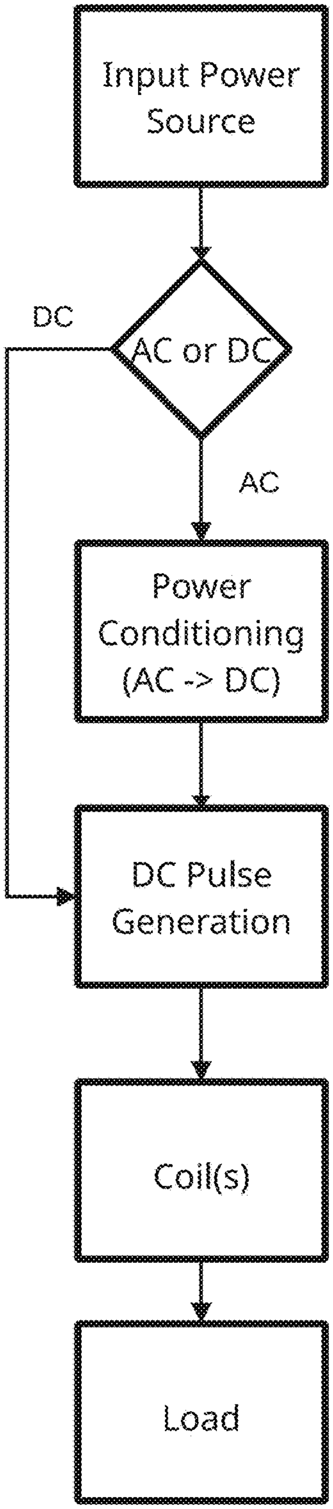
FIG. 7A shows a flowchart, according to an embodiment of the subject invention, where a single DC pulse is used and a single load is attached the system.
Figure 7B:
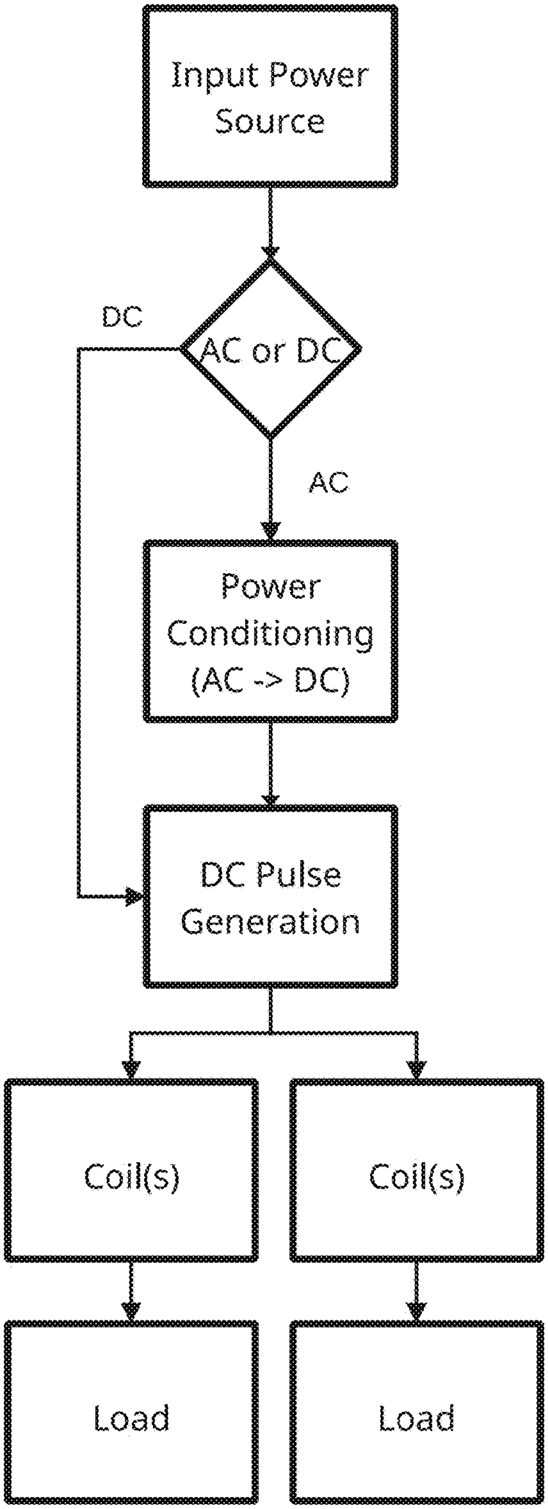
FIG. 7B shows a flowchart, according to an embodiment of the subject invention, where two DC pulses are used and multiple loads are attached to the system.
Figure 8A:
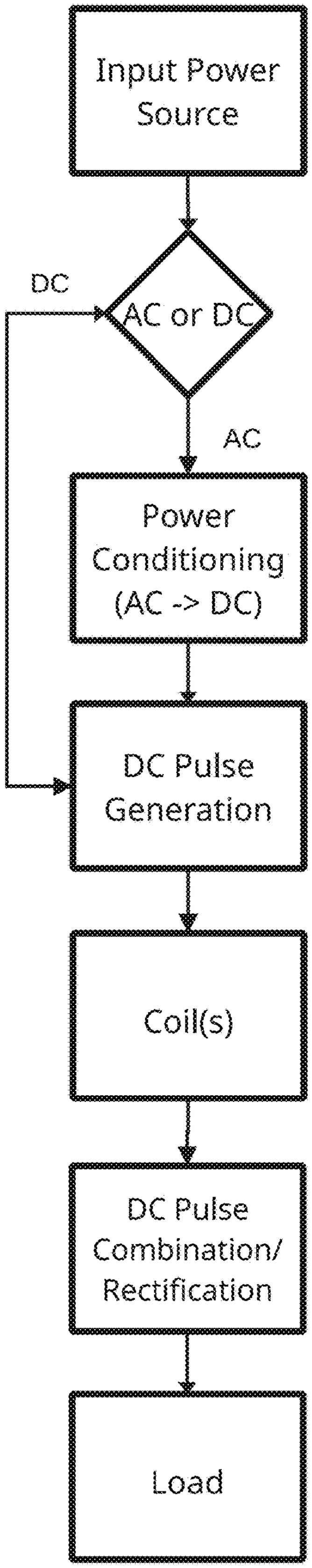
FIG. 8A shows a flowchart, according to an embodiment of the subject invention, where a single DC pulse is used with a DC pulse combination/rectification and a single load is attached to the system.
Figure 8B:
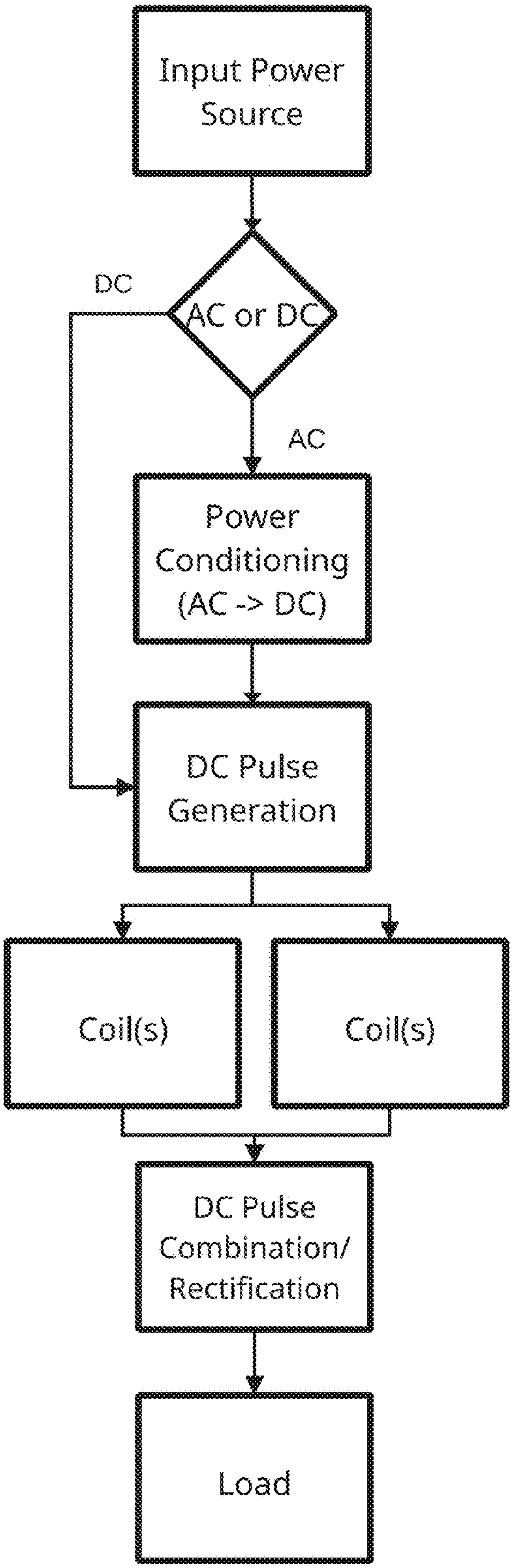
FIG. 8B shows a flowchart, according to an embodiment of the subject invention, where two DC pulses are used with a DC pulse combination/rectification and multiple loads are attached to the system.

FIG. 7A shows a flowchart, according to an embodiment of the subject invention, where a single DC pulse is used and a single load is attached the system; and FIG. 7B shows a flowchart, according to an embodiment of the subject invention, where two DC pulses are used and multiple loads are attached to the system. FIG. 8A shows a flowchart, according to an embodiment of the subject invention, where a single DC pulse is used with a DC pulse combination/rectification (for AC output) and a single load is attached to the system; and FIG. 8B shows a flowchart, according to an embodiment of the subject invention, where two DC pulses are used with a DC pulse combination/rectification (for AC output) and multiple loads are attached to the system. If the input signal is AC, it must first be conditioned to a DC pulse signal before being input into the system.

Systems and methods for amplifying power according to embodiments of the subject invention can be scaled using Equations 1-5D. The electromotive torque force (F) acting at right angles in the core 101 and cutting across the windings is represented by Equation 1 below, where q is electric charge, E is external electric field, v is velocity, B is magnetic field, and the "x" between the v and b represents cross product.

$$F=qE+qv\times B \tag{1}$$

The electromotive torque force is proportional to q and to the magnitude of the vector cross product v×B. In terms of the angle ϕ between v and B, the magnitude of the electromotive torque force equals qvB (sin ϕ). A result of the Lorentz force is the motion of a charged particle in a uniform magnetic field. If v is perpendicular to B (i.e., with the angle ϕ between v and B of 90°), the particle will follow a circular trajectory with a radius (r) of r=(mv)/(qB), where m is the mass of the particle.

The magnetic field is given by Equation 2 below, where $\mu_o$ is the permeability of the core material, N is the number of turns in the primary winding, I is the current going through the primary winding 103, and l is the effective length of the primary winding 103 on the core 101.

$$B=(\mu_o*N*I)/l \tag{2}$$

The flux ($\Phi_s$) linking a single turn of a solenoid is given by Equation 3A, and the magnetic flux ($\Phi_t$) linking all turns of the solenoid is given by Equation 3B, where A is the cross-sectional area of the core 101.

$$\Phi_s=B*A \tag{3A}$$

$$\Phi_t=N*B*A=(\mu_o*N^2*A*I)/l \tag{3B}$$

The frequency of oscillation ($f_{tc}$) of an LRC "tank circuit" can be calculated using inductance (L) and capacitance (C) of a coil (e.g., the primary winding) using Equation 4 below.

$$f_{tc}=1/[2\pi*(LC)^{1/2}] \tag{4}$$

The attenuation of energy in an oscillator can be computed based on the current (I(t)) and voltage ($V_c$(t)) using Equations 5A-5D below, where Vo is the initial voltage, R is the resistance, and e is Euler's number (~2.71828).

$$I(t) = \frac{V_0}{\beta L} e^{-at} \sin\beta t \tag{5A}$$

$$V_0(t) = V_0 e^{-at} \cos\beta t \tag{5B}$$

$$\beta = \sqrt{\frac{1}{LC} - \frac{R^2}{4L^2}} \tag{5C}$$

$$a = \frac{R}{2L} \tag{5D}$$

The core 101 can be analyzed as a beam using the Bernoulli-Euler equations. Using the Free-Free model to determine the model first harmonic frequency, Equation 6 can be used, where L is the length of the core, E is the Young's modulus of elasticity of the core, I is the moment of inertia (second moment of area) of the beam cross-section for the core, and p is the core mass per length.

$$f_1 = \frac{1}{2 \cdot \pi} \left[ \frac{22.373}{L^2} \right] \frac{\sqrt{EI}}{p} \tag{6}$$

For the system where the core has a linear form factor, the results for an iron/steel alloy core are shown in FIGS. 10A and 10B, where the curve crosses the axis near 0.22373 on the left and 0.77627 on the right. The resulting wavelength ($L_w$) is defined as:

$$L_w = (0.77627 - 0.22373) = 0.55254 \tag{7A}$$

For the system where the core has a toroid form factor, using Equation 6 the curve crossed the axis near 0.25 on the left and 0.75 on right. The resulting wavelength ($L_w$) is defined as:

$$L_w = (0.75 - 0.25) = 0.5 \tag{7B}$$

A wave can propagate through the core by causing the material of the core to vibrate in a periodic manner. This transfer of energy through the material is known as elastic wave propagation, and there are two main types of elastic waves that can occur in solids: longitudinal waves (also called compression waves); and transverse waves (also called shear waves). Embodiments of the subject invention utilize longitudinal waves where the particles of the material of the core to vibrate in the same direction as the wave propagation. The velocity at which these waves propagate through the core is dependent on the density and elasticity of the material.

As the disruptive magnetic pulse enters the metal core, it causes valance electrons to slightly rotate and align, forming a strong sympathetic reaction to the pulse. This alignment can cause the magnetic density of the core to be orders of magnitude stronger than the magnetic field pulse density created within the coil. When the DC pulse is turned off, the spin of the electrons try to realign in the lattice structure of the metal. Not all of these spins realign, and harmonic vibrational nodes form magnetic poles. Every core has a lattice structure natural vibrational frequency of its lattice structure. As the lattice structure realigns there are many "attenuation" harmonics. Lattice structure vibrations from the contraction and expansion of metal cores create longitudinal waves that travel at a specific velocity. This velocity depends on the "elasticity" of the metal in the core and its density per unit of core length.

When the DC pulse is injected (e.g., at node 301A shown in FIG. 4, or node 301C shown in FIGS. 5A-5I) at the primary windings 103, current is created in the secondary winding 102A,102B. If the DC pulse rate is below the natural resonant frequency of the system, by increasing the DC pulse frequency the voltage and current output will increase until the resonant frequency is reached. If the pulse rate continues to increase past the natural resonant frequency, the voltage and current output decrease. The natural resonant frequency corresponds to the point of maximum power amplification.

The resonant frequency, $f_w$, can be calculated using Equation 8, where $V_{CLS}$ is the core lattice structure velocity and L is the length of the core. This results in the theoretical harmonic frequency of the core. The theoretical value may be different from the natural resonant frequency (e.g., due to the core material not being 100% solid), so a range (e.g., +/−20% of the calculated $f_w$) can be tested to determine the actual resonant frequency and therefore point of maximum power amplification.

$$f_w = V_{CLS}/(2*L) \tag{8}$$

By aligning the spin rotation of valance electrons in the core it is possible to create an extremely dense magnetic field. When the DC pulse is off this magnetic field collapses inside the core. As the field collapses, the contraction of the lattice structure occurs within the core and the valance electron spin quickly realigns. This dense magnetic field core collapse, creating a strong counter electromotive force (EMF) in the secondary wires, produces a strong pulse of output power. That is, the DC pulse input can excite a latent form of energy in the lattice structure of the core that when constantly excited increases to a much higher potential energy level, while at the same time reducing molecular movement resistance to near zero. This potential energy can be transferred to kinetic energy in the output current.

Figure 9:
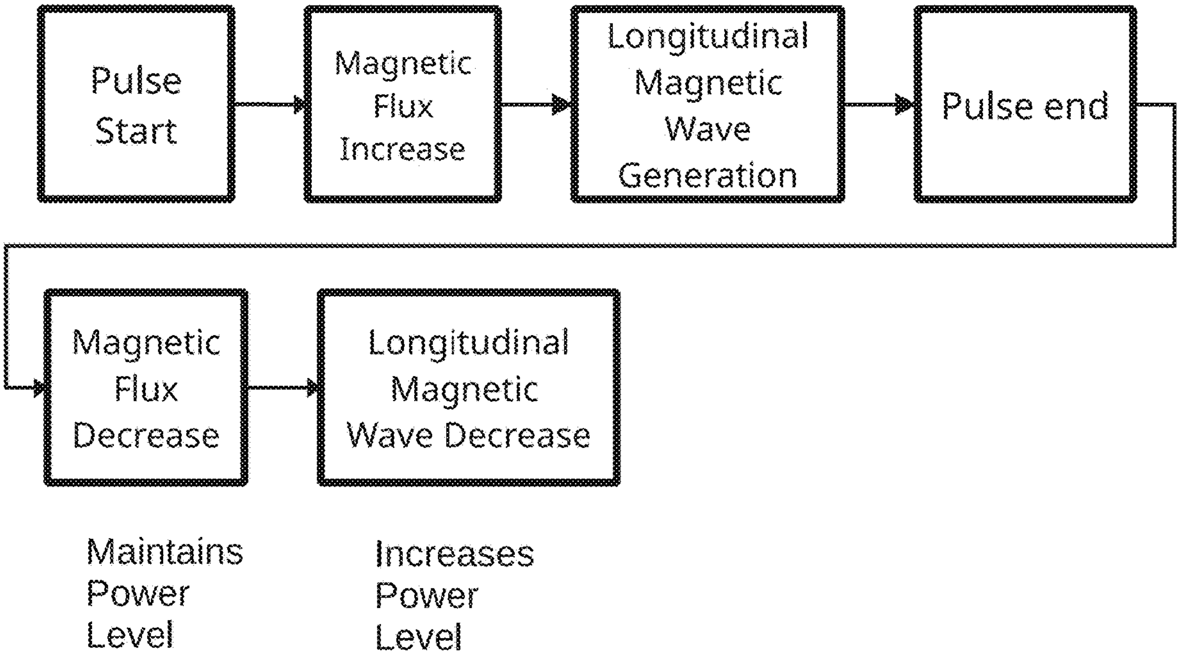
FIG. 9 is a flowchart of the DC pulse as it transitions through the system of FIG. 4 and FIGS. 5A-5I.

FIG. 9 shows a flowchart of the DC pulse as it transitions through a parallel inductor system (e.g., of FIGS. 4, 5A-5I). When the energy output of magnetic resonant motion in the core is tapped into, another source of energy is accessed. When the DC pulse enters the system at resonant frequency, the magnetic field on the inside of the coil causes the valance electrons in the magnetic core to align with the magnetic field. The alignment generates an increased lattice structure pressure, which causes an elongation stress/strain in the entire length of the core. The alignment of electrons in the core causes a natural attenuation, quantized energy absorption, process within the core and produces a separate magnetic field. These fields are additive and produce a very dense magnetic field. It is noted that the input DC pulse does not need to be at the resonant frequency to be amplified (see, e.g., Examples 1-4), but the greatest amplification is expected to be achieved at the resonant frequency.

When the DC pulse ends, the decreasing lattice structure pressure from elongation stress/strain reverses and the two magnetic fields from the primary winding and the core separate. This separation creates a counter EMF in the primary winding that produced the magnetism, and the current is pulsed into the secondary winding wires.

Systems and methods of embodiments of the subject invention amplify the voltage and amperage (and therefore power) of a pulsed DC input. The enhanced magnetic field is caused by the additive forces, including inductance from the primary winding(s) and the linear lattice structure wave of the magnetic core that oscillates the magnetically aligned valance electrons over the entire length of the core. Through these forces, amplification (of voltage and current, and therefore power) is achieved. By harnessing the oscillating motion of the linear wave at its resonant frequency, additional EMFs that are normally not considered in electrical generation are captured and used to produce a very efficient power amplification system/method.

When ranges are used herein, combinations and subcombinations of ranges (e.g., subranges within the disclosed range) and specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The subject invention includes, but is not limited to, the following exemplified embodiments.

Embodiment 1. A system for amplifying power, the system comprising:

- a magnetic core;
- a primary winding wound around the magnetic core in a first winding direction, the first winding direction being a clockwise direction or a counterclockwise direction;
- a first secondary winding wire wound around the magnetic core in the first winding direction;
- a second secondary winding wire wound around the magnetic core in the first winding direction; and
- a connection wire connecting the first secondary winding wire to the second secondary winding wire,
- wherein the primary winding comprises a first end configured to receive an input signal and a second end opposite from the first end, and
- wherein each of the primary winding, the first secondary winding wire, the second secondary winding wire, and the connection wire comprises metal.

Embodiment 2. The system according to embodiment 1, wherein the input signal is a DC pulse signal.

Embodiment 3. The system according to any of embodiments 1-2, wherein the first secondary winding wire and the second secondary winding wire are wound around the magnetic core such that each of the first secondary winding wire and the second secondary winding wire is disposed closer to the magnetic core than is the primary winding (see also, e.g., FIG. 3C).

Embodiment 4. The system according to any of embodiments 1-3, wherein the primary winding is wound around the first secondary winding wire and the second secondary winding wire such that the primary winding is in physical contact with at least one of the first secondary winding and the second secondary winding (see also, e.g., FIG. 3C).

Embodiment 5. The system according to any of embodiments 1-4, wherein the magnetic core comprises a first end and a second end opposite from the first end of the magnetic core,

- wherein the first secondary winding wire comprises a first end at the first end of the magnetic core and a second end at the second end of the magnetic core,
- wherein the second secondary winding wire comprises a first end at the first end of the magnetic core and a second end at the second end of the magnetic core, and
- wherein the connection wire connects the first end of the first secondary winding wire to the second end of the secondary winding wire.

Embodiment 6. The system according to any of embodiments 1-5, wherein the primary winding comprises a first insulative coating (see also, e.g., FIG. 3D).

Embodiment 7. The system according to any of embodiments 1-6, wherein the first secondary winding wire comprises a second insulative coating (see also, e.g., FIG. 3D).

Embodiment 8. The system according to any of embodiments 1-7, wherein the second secondary winding wire comprises a third insulative coating (see also, e.g., FIG. 3D).

Embodiment 9. The system according to any of embodiments 1-8, wherein the connection wire comprises a fourth insulative coating (see also, e.g., FIG. 3D).

Embodiment 10. The system according to any of embodiments 1-9, wherein the magnetic core comprises iron (e.g., an iron alloy such as an iron/steel alloy, or where the magnetic core is an iron core).

Embodiment 11. The system according to any of embodiments 1-10, wherein the magnetic core has a linear form factor (see also, e.g., FIGS. 3E, 5D, 5E, 5F and 19).

Embodiment 12. The system according to any of embodiments 1-10, wherein the magnetic core has a toroid form factor (see also, e.g., FIGS. 3F, 5G, 5H, 5I, 20, and 21).

Embodiment 13. The system according to any of embodiments 1-12, wherein the metal of the primary winding, the metal of the first secondary winding wire, the metal of the second secondary winding wire, and the metal of the connection wire are the same (i.e., same material) as each other.

Embodiment 14. A method for amplifying power, the method comprising:

- providing the system according to any of embodiments 1-13;
- inputting the input signal to the first end of the primary winding; and
- receiving an amplified output signal from at least one of the first secondary winding wire and the second secondary winding wire,
- wherein the input signal is a DC pulse signal.

Embodiment 15. A system for amplifying power, the system comprising:

- a first magnetic core;
- a first primary winding wound around the first magnetic core in a first winding direction, the first winding direction being a clockwise direction or a counterclockwise direction;
- a first secondary winding wire wound around the first magnetic core in the first winding direction;
- a second secondary winding wire wound around the first magnetic core in the first winding direction;
- a second magnetic core physical spaced apart from the first magnetic core;
- a second primary winding wound around the second magnetic core in a second winding direction, the second winding direction being opposite from the first winding direction;
- a third secondary winding wire wound around the second magnetic core in the second winding direction;
- a fourth secondary winding wire wound around the second magnetic core in the second winding direction;
- a plurality of connection wires electrically connecting the first secondary winding wire, the second secondary winding wire, the third secondary winding wire, and the fourth secondary winding wire,
- wherein the first primary winding comprises a first end configured to receive an input signal and a second end opposite from the first end,
- wherein the second primary winding comprises a first end configured to receive the input signal and a second end opposite from the first end, and
- wherein each of the first primary winding, the second primary winding, the first secondary winding wire, the second secondary winding wire, the third secondary winding wire, the fourth secondary winding wire, and each connection wire of the plurality of connection wires comprises metal.

Embodiment 16. The system according to embodiment 15, wherein the input signal is a DC pulse signal.

Embodiment 17. The system according to embodiment 16 wherein when the DC pulse signal is applied the first magnetic core comprises a north end and a south end opposite from the north end, wherein when the DC pulse signal is applied the second magnetic core comprises a north end and a south end opposite from the north end, wherein the first end of the first primary winding is disposed at the north end of the first magnetic core, and wherein the first end of the second primary winding is disposed at the south end of the second magnetic core.

Embodiment 18. The system according to any of embodiments 15-17, wherein the first secondary winding wire and the second secondary winding wire are wound around the first magnetic core such that each of the first secondary winding wire and the second secondary winding wire is disposed closer to the first magnetic core than is the first primary winding.

Embodiment 19. The system according to any of embodiments 15-18, wherein the first primary winding is wound around the first secondary winding wire and the second secondary winding wire such that the first primary winding is in physical contact with at least one of the first secondary winding and the second secondary winding.

Embodiment 20. The system according to any of embodiments 15-19, wherein the third secondary winding wire and the fourth secondary winding wire are wound around the second magnetic core such that each of the third secondary winding wire and the fourth secondary winding wire is disposed closer to the second magnetic core than is the second primary winding.

Embodiment 21. The system according to any of embodiments 15-20, wherein the second primary winding is wound around the third secondary winding wire and the fourth secondary winding wire such that the second primary winding is in physical contact with at least one of the third secondary winding and the fourth secondary winding.

Embodiment 22. The system according to any of embodiments 15-21, wherein the first primary winding comprises a first insulative coating.

Embodiment 23. The system according to any of embodiments 15-22, wherein the second primary winding comprises a second insulative coating.

Embodiment 24. The system according to any of embodiments 15-23, wherein the first secondary winding wire comprises a third insulative coating.

Embodiment 25. The system according to any of embodiments 15-21, wherein the second secondary winding wire comprises a fourth insulative coating.

Embodiment 26. The system according to any of embodiments 15-25, wherein the third secondary winding wire comprises a fifth insulative coating.

Embodiment 27. The system according to any of embodiments 15-26, wherein the fourth secondary winding wire comprises a sixth insulative coating.

Embodiment 28. The system according to any of embodiments 15-27, wherein each connection wire of the plurality of connection wires comprises a respective seventh insulative coating.

Embodiment 29. The system according to any of embodiments 15-28, wherein the magnetic core comprises iron (e.g., an iron alloy such as an iron/steel alloy, or where the magnetic core is an iron core).

Embodiment 30. The system according to any of embodiments 15-29, wherein the first magnetic core has a linear form factor, and wherein the second magnetic core has a linear form factor.

Embodiment 31. The system according to any of embodiments 15-29, wherein the first magnetic core has a toroid form factor, and wherein the second magnetic core has a toroid form factor.

Embodiment 32. The system according to any of embodiments 15-31, wherein the metal of the first primary winding, the metal of the second primary winding, the metal of the first secondary winding wire, the metal of the second secondary winding wire, the metal of the third secondary winding wire, the metal of the fourth secondary winding wire, and the metal of each connection wire of the plurality of connection wires are the same as each other.

Embodiment 33. The system according to any of embodiments 15-32, wherein the plurality of connection wires electrically connect the first secondary winding wire, the second secondary winding wire, the third secondary winding wire, and the fourth secondary winding wire as shown in FIG. 5A.

Embodiment 34. The system according to any of embodiments 15-32, wherein the plurality of connection wires electrically connect the first secondary winding wire, the second secondary winding wire, the third secondary winding wire, and the fourth secondary winding wire as shown in FIG. 5B.

Embodiment 35. The system according to any of embodiments 15-32, wherein the plurality of connection wires electrically connect the first secondary winding wire, the second secondary winding wire, the third secondary winding wire, and the fourth secondary winding wire as shown in FIG. 5C.

Embodiment 36. The system according to any of embodiments 15-32, wherein the plurality of connection wires electrically connect the first secondary winding wire, the second secondary winding wire, the third secondary winding wire, and the fourth secondary winding wire in a configuration not shown in FIG. 5A, 5B, or 5C.

Embodiment 37. The system according to any of embodiments 15-36, wherein the first magnetic core is disposed in its individual capacitive field with the first primary winding, the first secondary winding, and the second secondary winding, and wherein the second magnetic core is disposed in its individual capacitive field with the second primary winding, the third secondary winding, and the fourth secondary winding.

Embodiment 38. A method for amplifying power, the method comprising:

providing the system according to any of embodiments 15-37;

inputting the input signal to the first end of the first primary winding and the first end of the second primary winding; and receiving an amplified output signal from at least one of the first secondary winding wire, the second secondary winding wire, the third secondary winding wire, and the fourth secondary winding wire, wherein the input signal is a DC pulse signal.

A greater understanding of the embodiments of the subject invention and of their many advantages may be had from the following examples, given by way of illustration.

The following examples are illustrative of some of the methods, applications, embodiments, and variants of the present invention. They are, of course, not to be considered as limiting the invention. Numerous changes and modifications can be made with respect to embodiments of the invention.

Example 1

Figure 12A:
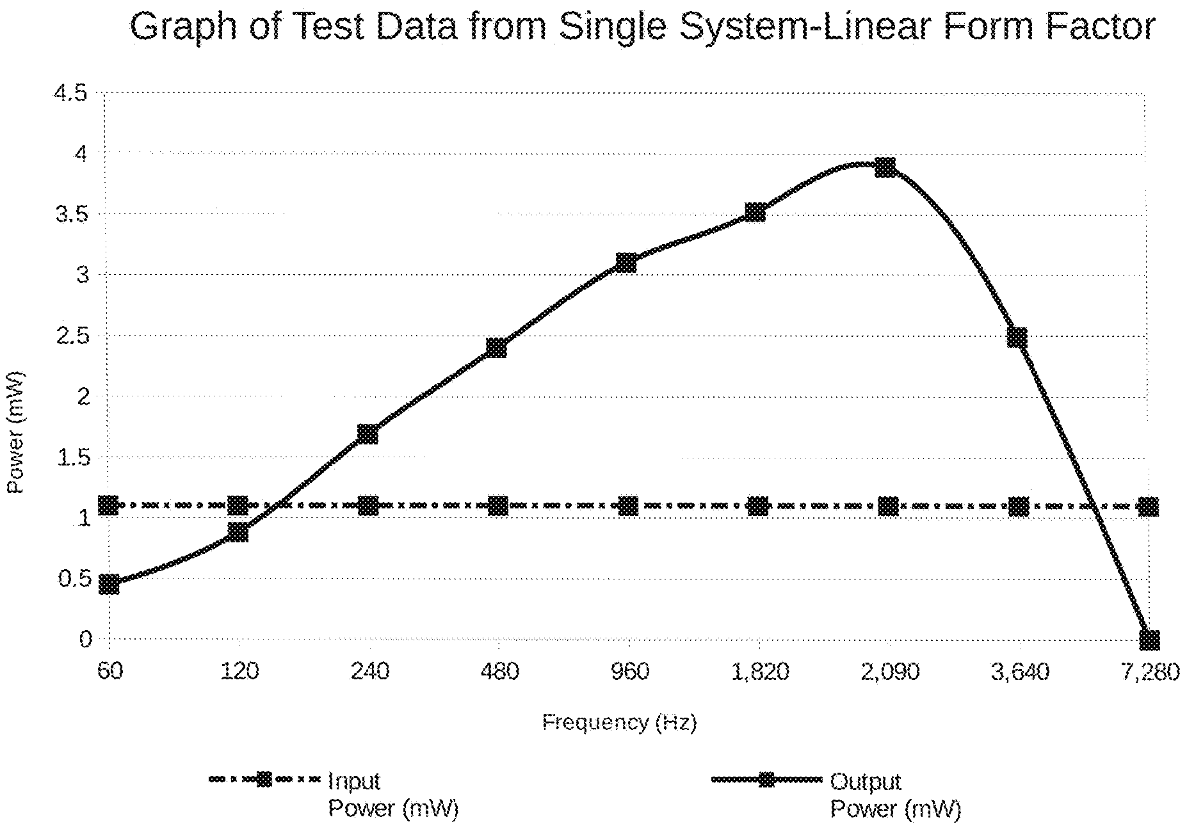
FIG. 12A shows a plot of power (in milliwatts (mW)) versus frequency (in Hz) showing input power and output power for the single inductor system from which the data in the table of FIG. 11 is obtained. The dashed line with the square data points is for input power; and the solid line with the square data points is for output power.
Figure 12B:
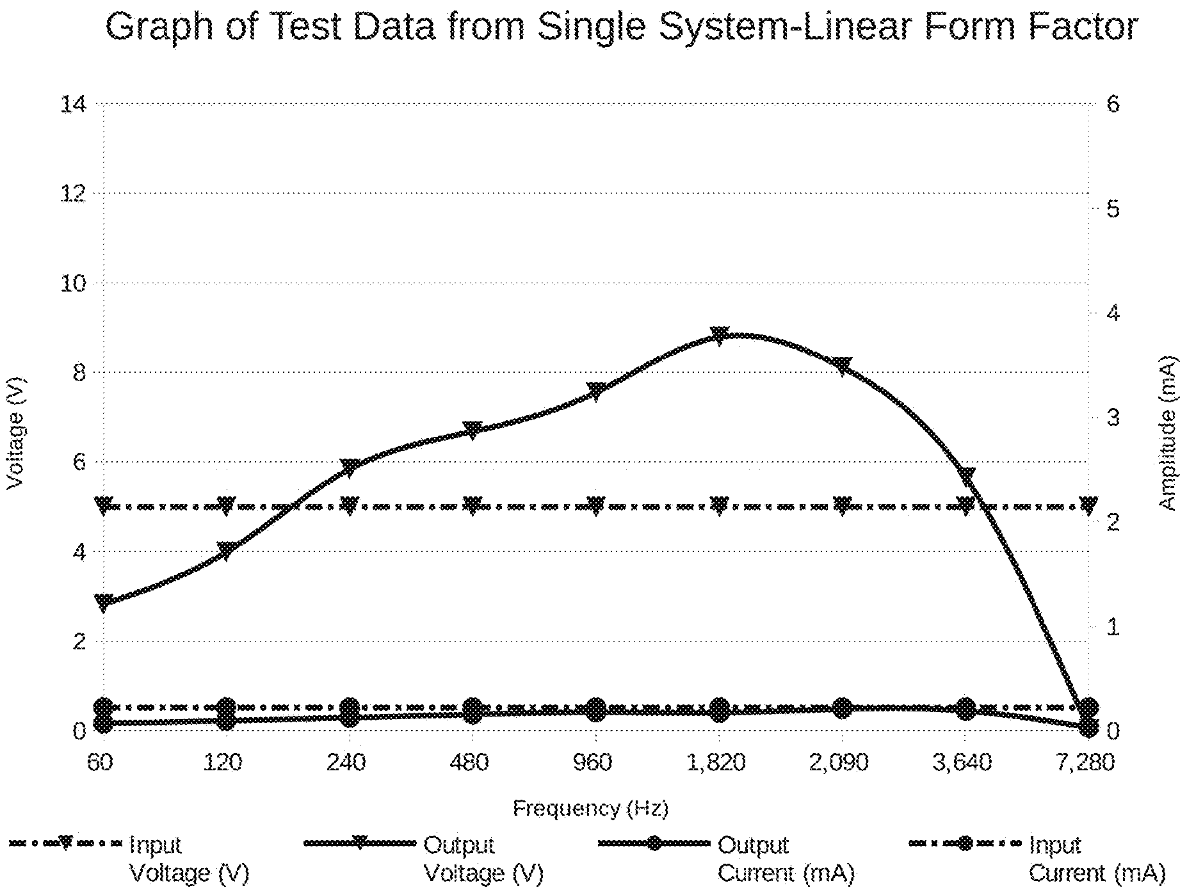
FIG. 12B shows a plot of voltage (in Volts (V)) and current (in milliamps (mA)) versus frequency (in Hz) showing input voltage, input current, output voltage, and output current for the single inductor system from which the data in the table of FIG. 11 is obtained. The dashed line with the downward-pointing triangle data points is for input voltage; the solid line with the downward-pointing triangle data points is for output voltage; the dashed line with the circle data points is for input current; and the solid line with the circle data points is for output current.

A single inductor system as shown in FIG. 4 was fabricated and tested. The core had a linear form factor and was an iron/steel alloy. The primary winding, the secondary winding wires, and the connection wire were each magnetic copper with an insulative coating. The primary winding and both secondary windings were wrapped around the core in the same direction as each other. The primary winding and both secondary windings all extended past the nodes of the core. An input voltage of 5 Volts (V) and an input current of 0.22 milliamps (mA) were used, for an input power of 1.10 milliwatts (mW). The DC pulse was provided to the single inductor system across a frequency range of 60 Hertz (Hz) to 7,280 Hz. The results are shown in the table in FIG. 11 and in the plots in FIGS. 12A and 12B. Referring to FIGS. 11, 12A, and 12B, the voltage, current, and power were amplified across most of the tested frequency range, with a maximum output power of 3.89 mW (amplified 3.54 times the input power of 1.10 mW).

Example 2

Figure 14A:
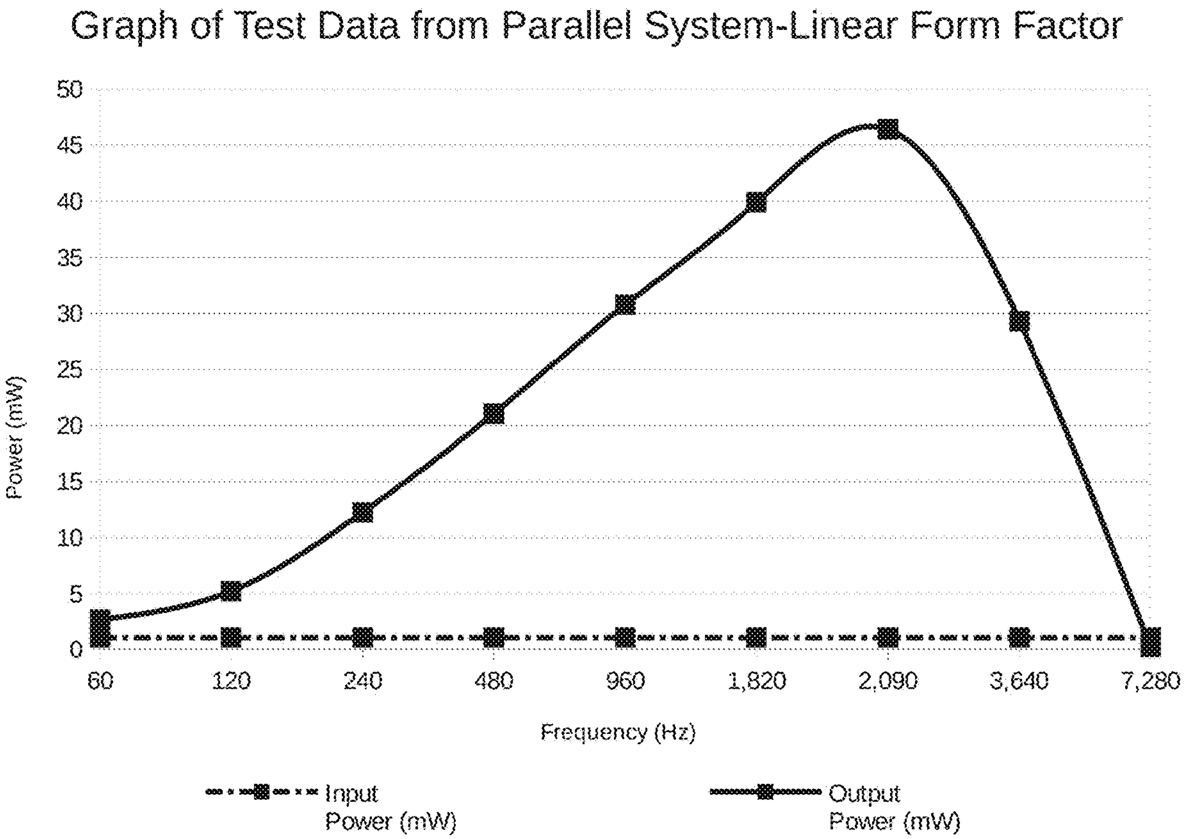
FIG. 14A shows a plot of power (in mW) versus frequency (Hz) showing input power and output power for the parallel inductor system from which the data in the table of FIG. 13 is obtained. The dashed line with the square data points is for input power; and the solid line with the square data points is for output power.
Figure 14B:
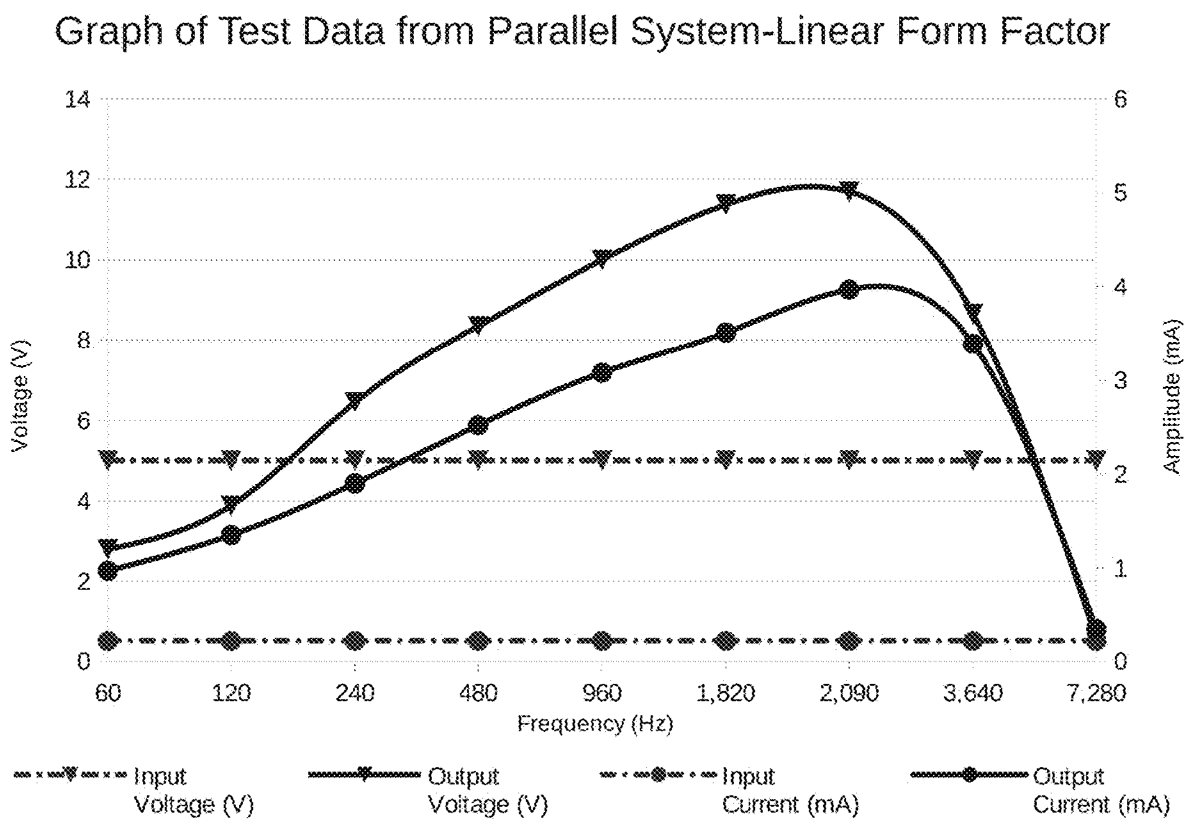
FIG. 14B shows a plot of voltage (in V) and current (in mA) versus frequency (in Hz) showing input voltage, input current, output voltage, and output current for the parallel inductor system from which the data in the table of FIG. 13 is obtained. The dashed line with the downward-pointing triangle data points is for input voltage; the solid line with the downward-pointing triangle data points is for output voltage; the dashed line with the circle data points is for input current; and the solid line with the circle data points is for output current.

A parallel inductor system as shown in FIG. 5C was fabricated and tested. The core of each inductor had a linear form factor and was an iron/steel alloy. The primary winding, the secondary winding wires, and the connection wires were each magnetic copper with an insulative coating. The primary winding and both secondary windings of the first inductor were wrapped around the core in the same direction as each other; and the primary winding and both secondary windings of the second inductor were wrapped around the core in the same direction as each other but in the opposite direction from the primary winding and both secondary windings in the first inductor. The primary winding and both secondary windings all extended past the nodes of the respective core in both the first inductor and the second inductor. An input voltage of 5 V and an input current of 0.22 mA were used, for an input power of 1.10 mW. The DC pulse was provided to the single inductor system across a frequency range of 60 Hz to 7,280 Hz. The results are shown in the table in FIG. 13 and in the plots in FIGS. 14A and 14B. Referring to FIGS. 13, 14A, and 14B, the voltage, current, and power were amplified across most of the tested frequency range, with a maximum output power of 46.41 mW (amplified 42.19 times the input power of 1.10 mW).

Example 3

Figure 16A:
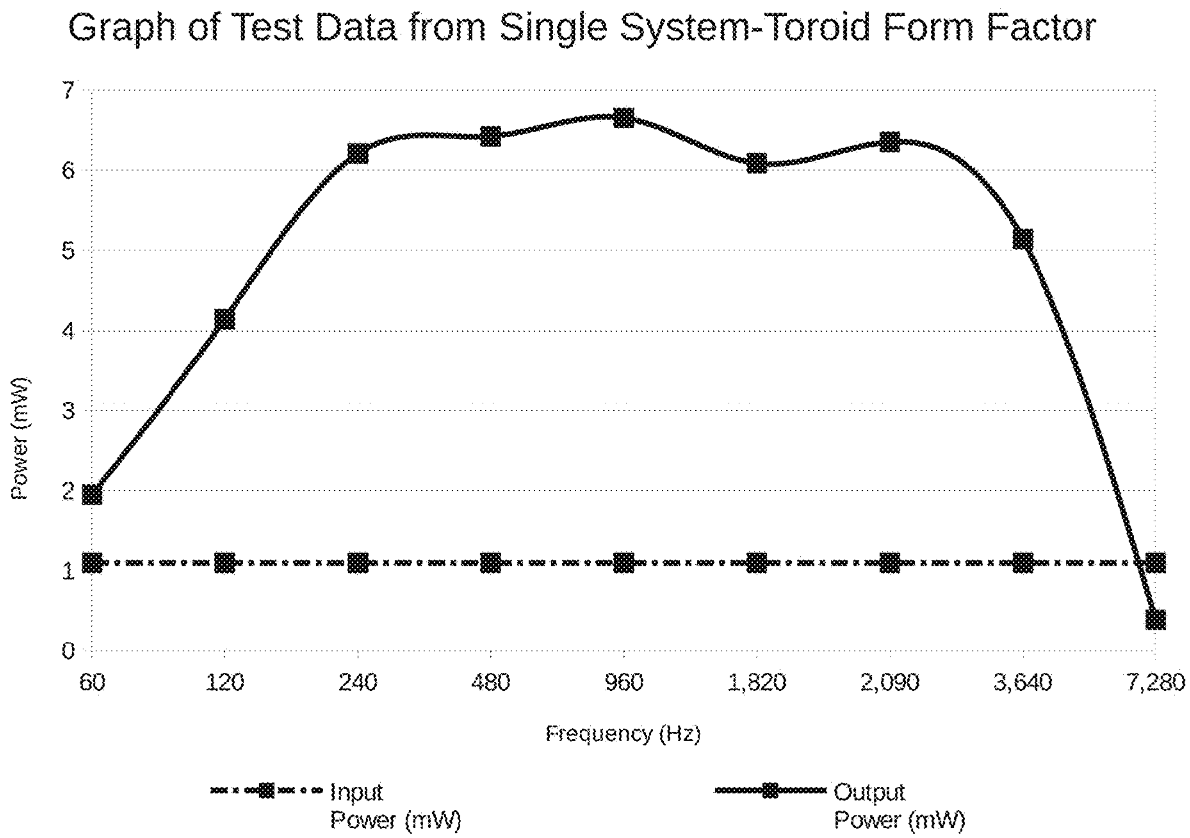
FIG. 16A shows a plot of power (in mW) versus frequency (in Hz) showing input power and output power for the single inductor system (toroid from factor) from which the data in the table of FIG. 15 is obtained. The dashed line with the square data points is for input power; and the solid line with the square data points is for output power.
Figure 16B:
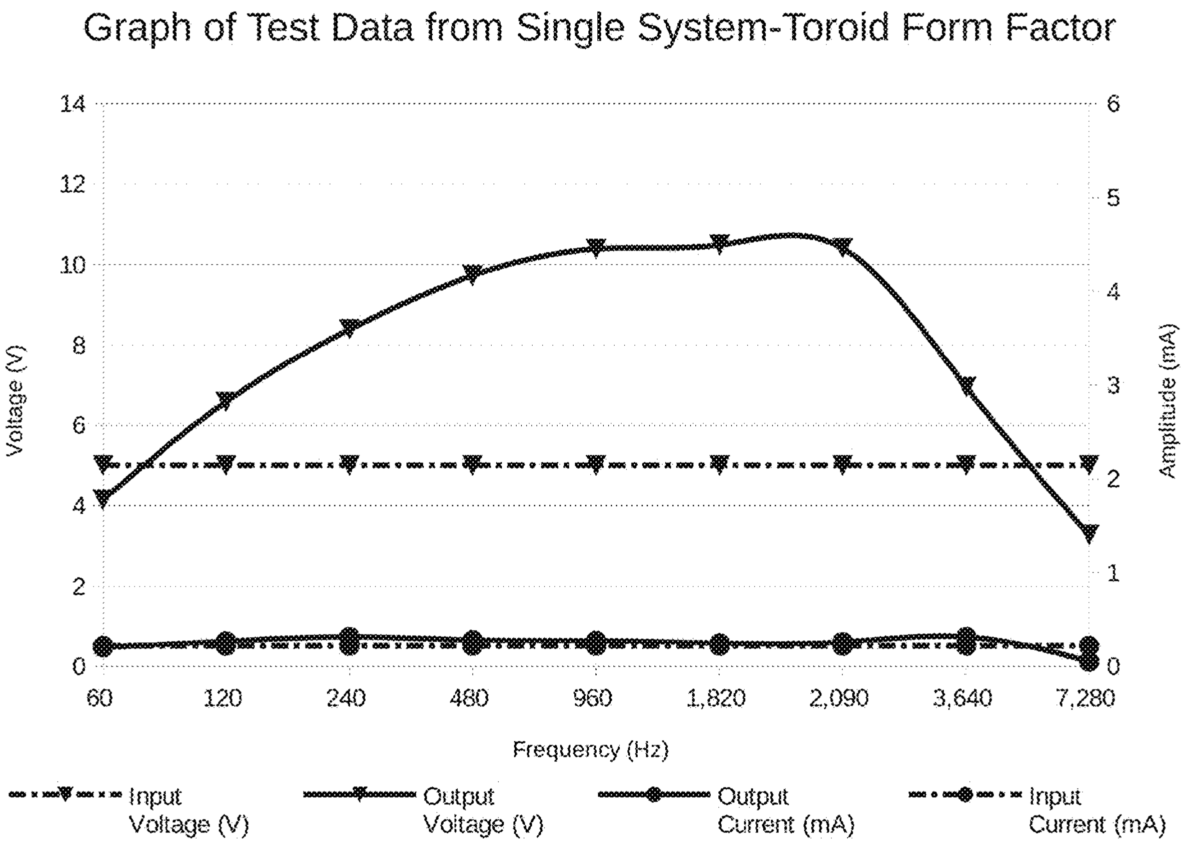
FIG. 16B shows a plot of voltage (in V) and current (in mA) versus frequency (in Hz) showing input voltage, input current, output voltage, and output current for the single inductor system (toroid from factor) from which the data in the table of FIG. 15 is obtained. The dashed line with the downward-pointing triangle data points is for input voltage; the solid line with the downward-pointing triangle data points is for output voltage; the dashed line with the circle data points is for input current; and the solid line with the circle data points is for output current.

A single inductor system as shown in FIG. 4 was fabricated and tested. The core had a toroid form factor and was an iron/steel alloy. The primary winding, the secondary winding wires, and the connection wire were each magnetic copper with an insulative coating. The primary winding and both secondary windings were wrapped around the core in the same direction as each other. The primary winding and both secondary windings all extended past the nodes of the core. An input voltage of 5 V and an input current of 0.22 mA were used, for an input power of 1.10 mW. The DC pulse was provided to the single inductor system across a frequency range of 60 Hz to 7,280 Hz. The results are shown in the table in FIG. 15 and in the plots in FIGS. 16A and 16B. Referring to FIGS. 15, 16A, and 16B, the voltage, current, and power were amplified across most of the tested frequency range, with a maximum output power of 6.35 mW (amplified 5.773 times the input power of 1.10 mW).

Example 4

Figure 18A:
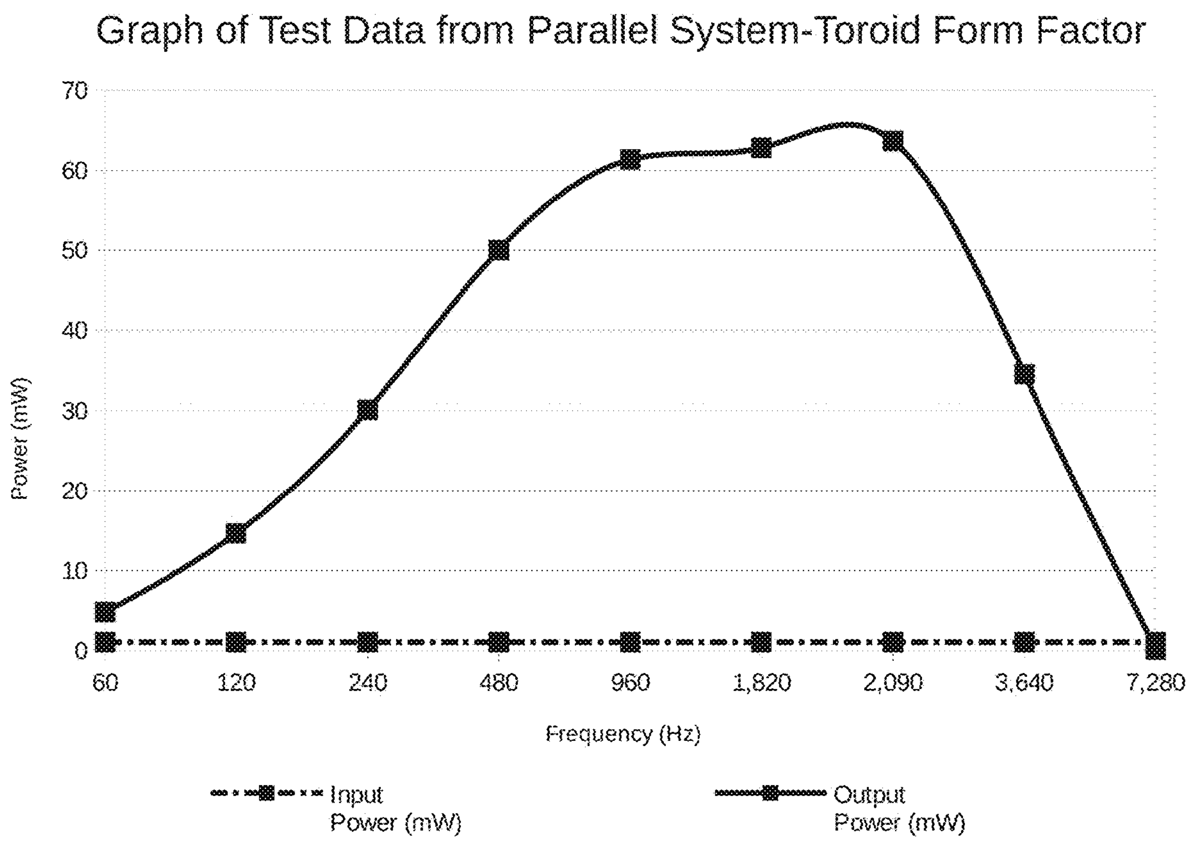
FIG. 18A shows a plot of power (in mW) versus frequency (Hz) showing input power and output power for the parallel inductor system (toroid from factor) from which the data in the table of FIG. 17 is obtained. The dashed line with the square data points is for input power; and the solid line with the square data points is for output power.
Figure 18B:
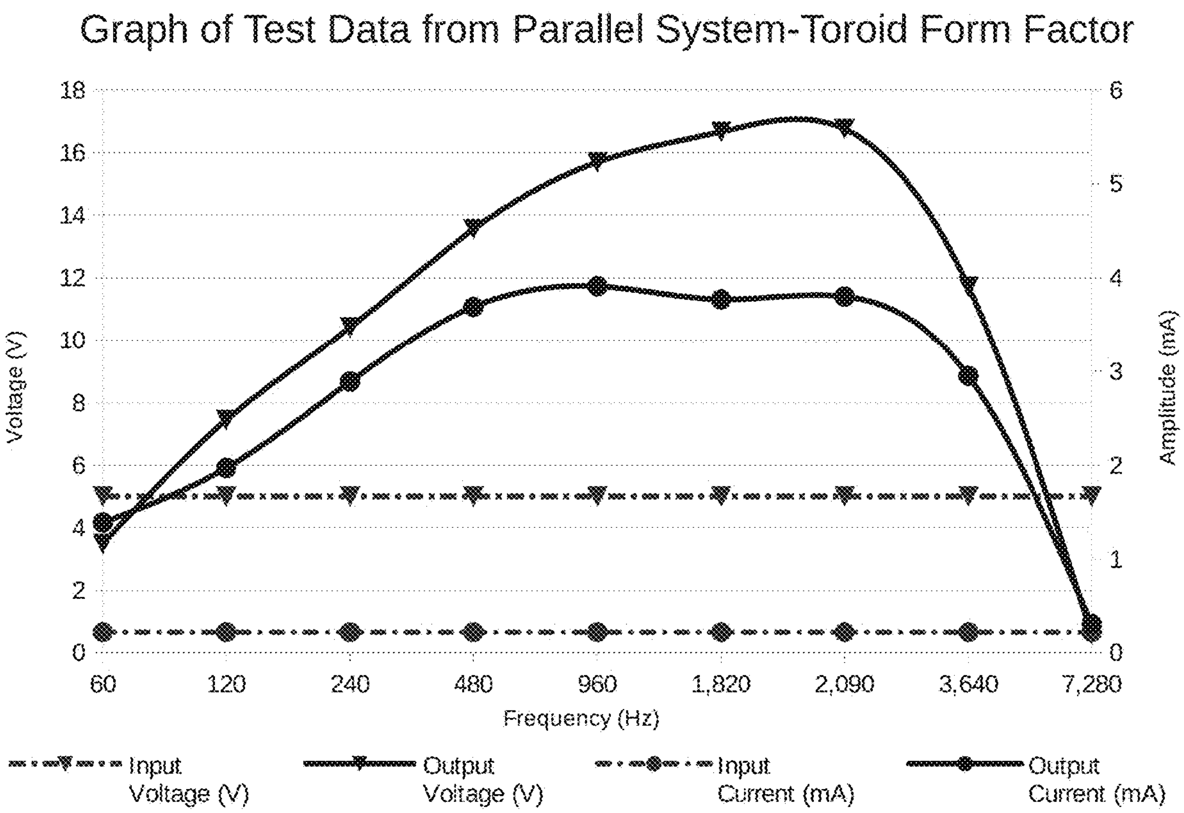
FIG. 18B shows a plot of voltage (in V) and current (in mA) versus frequency (in Hz) showing input voltage, input current, output voltage, and output current for the parallel inductor system (toroid from factor) from which the data in the table of FIG. 17 is obtained. The dashed line with the downward-pointing triangle data points is for input voltage.

A parallel inductor system as shown in FIG. 5C was fabricated and tested. The core of each inductor had a toroid form factor and was an iron/steel alloy. The primary winding, the secondary winding wires, and the connection wires were each magnetic copper with an insulative coating. The primary winding and both secondary windings were wrapped around the core in the same direction as each other in the first inductor; and the primary winding and both secondary windings of the second inductor were wrapped around the core in the same direction as each other but in the opposite direction from the primary winding and both secondary windings in the first inductor. The primary winding and both secondary windings all extended past the nodes of the respective core in both the first inductor and the second inductor. An input voltage of 5 V and an input current of 0.22 mA were used, for an input power of 1.10 mW. The DC pulse was provided to the single inductor system across a frequency range of 60 Hz to 7,280 Hz. The results are shown in the table in FIG. 17 and in the plots in FIGS. 18A and 18B. Referring to FIGS. 17, 18A, and 18B, the voltage, current, and power were amplified across most of the tested frequency range, with a maximum output power of 63.65 mW (amplified 57.86 times the input power of 1.10 mW).

The results in this example, as well as Examples 1-3, show that the power amplification systems and methods of embodiments of the subject invention plainly work to amplify voltage, current, and power of an input signal (e.g., a pulsed DC input signal).

Example 5

An experiment was performed on a parallel inductor system as shown in FIG. 5C, both for a system where the core of each inductor had a linear form factor (iron/steel alloy) and for a system where the core of each inductor had a toroid form factor (iron/steel alloy). The primary winding, the secondary winding wires, and the connection wires were each magnetic copper with an insulative coating. The primary winding and both secondary windings were wrapped around the core in the same direction as each other in the first inductor; and the primary winding and both secondary windings of the second inductor were wrapped around the core in the same direction as each other but in the opposite direction from the primary winding and both secondary windings in the first inductor. The primary winding and both secondary windings all extended past the nodes of the respective core in both the first inductor and the second inductor. An analysis was performed at a frequency of 2.097 kilohertz (kHz) to determine inductance, resistance, and capacitance values for the windings in each inductor. FIG. 22 shows a table with the results.

Referring to FIG. 22, the top three sections show results for the Linear form factor. The upper-left section shows results for a first inductor of the linear form factor system illustrated by FIGS. 3B and 4 (labeled "Linear Left"), with resistance (row labeled "Rs", in Ohms), impedance (row labeled "Zs", in Ohms), inductance (row labeled "Henry", in millihenries), and capacitance (row labeled "Farad", in microfarads) for the primary winding (column labeled "FIG. 3B: 301A, 306A"), first secondary winding (column labeled "FIG. 3B: 303A, 307A"), second secondary winding (column labeled "FIG. 3B: 305A, 308A") and both secondary windings in a bifilar connection (column labeled "FIG. 4: 305A, 307A").

The second-left section shows results for the second inductor of the linear form factor system (labeled "Linear Right"), with resistance (row labeled "Rs", in Ohms), impedance (row labeled "Zs", in Ohms), inductance (row labeled "Henry", in millihenries), and capacitance (row labeled "Farad", in microfarads) for the primary winding (column labeled "FIG. 3B: 301A, 306A"), first secondary winding (column labeled "FIG. 3B: 303A, 307A"), second secondary winding (column labeled "FIG. 4: 305A, 308A") and both secondary windings in a bifilar connection (column labeled "FIG. 4: 305A, 307A").

The upper-right middle section of FIG. 22 shows results for the parallel inductor system where the Linear Left inductor joined to the Linear right inductor as illustrated in FIG. 5C with resistance (row labeled "Rs", in Ohms), impedance (row labeled "Zs", in Ohms), inductance (row labeled "Henry", in millihenries), and capacitance (row labeled "Farad", in microfarads). The primary input parallel structure (labeled FIG. 5C: 301C, 306C) and the series output structure (labeled FIG. 5C: 303B, 308A) results are given.

Referring to FIG. 22, the bottom three sections show results for the Toroid form factor. The third-left section shows results for a first inductor of the Toroid form factor system (labeled "Toroid Left"), with resistance (row labeled "Rs", in Ohms), impedance (row labeled "Zs", in Ohms), inductance (row labeled "Henry", in millihenries), and capacitance (row labeled "Farad", in microfarads) for the primary winding (column labeled "FIG. 3B: 301A, 306A"), first secondary winding (column labeled "FIG. 3B: 303A, 307A"), second secondary winding (column labeled "FIG. 3B: 305A, 308A"), and both secondary windings in a bifilar connection (column labeled "FIG. 4: 305A, 307A").

The fourth-left section shows results for the second inductor of the Toroid form factor system (labeled "Toroid Right"), with resistance (row labeled "Rs", in Ohms), impedance (row labeled "Zs", in Ohms), inductance (row labeled "Henry", in millihenries), and capacitance (row labeled "Farad", in microfarads) for the primary winding (column labeled "FIG. 3B: 301A, 306A"), first secondary winding (column labeled "FIG. 3B: 303A, 307A"), second secondary winding (column labeled "FIG. 3B: 305A, 308A"), and both secondary windings in a bifilar connection (column labeled "FIG. 4: 305A, 307A").

The bottom-right middle section of FIG. 22 shows results for the parallel inductor system where the Toroid Left inductor joined to the Toroid right inductor as illustrated in FIG. 5C, with resistance (row labeled "Rs", in Ohms), impedance (row labeled "Zs", in Ohms), inductance (row labeled "Henry", in millihenries), and capacitance (row labeled "Farad", in microfarads). The primary input parallel structure (labeled FIG. 5C: 301C, 306C) and the series output structure (labeled FIG. 5C: 303B, 308A) results are given.

FIG. 22 shows the resistance, impedance, inductance, and capacitance as tested at the frequency of 2,097 Hertz for all wires and connections as configured in FIG. 3B, FIG. 4, and FIG. 5C.

The results of FIG. 22 confirm Equations 1-5D.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for amplifying power, the system comprising:

a first magnetic core;

a first primary winding wound around the first magnetic core in a first winding direction, the first winding direction being a clockwise direction or a counterclockwise direction;

a first secondary winding wire wound around the first magnetic core in the first winding direction;

a second secondary winding wire wound around the first magnetic core in the first winding direction;

a second magnetic core physical spaced apart from the first magnetic core;

a second primary winding wound around the second magnetic core in a second winding direction, the second winding direction being opposite from the first winding direction;

a third secondary winding wire wound around the second magnetic core in the second winding direction;

a fourth secondary winding wire wound around the second magnetic core in the second winding direction;

a plurality of connection wires electrically connecting the first secondary winding wire, the second secondary winding wire, the third secondary winding wire, and the fourth secondary winding wire, wherein the first primary winding comprises a first end configured to receive an input signal and a second end opposite from the first end, wherein the second primary winding comprises a first end configured to receive the input signal and a second end opposite from the first end, wherein each of the first primary winding, the second primary winding, the first secondary winding wire, the second secondary winding wire, the third secondary winding wire, the fourth secondary winding wire, and each connection wire of the plurality of connection wires comprises metal.

2. The system according to claim 1, wherein the input signal is a direct current (DC) pulse signal.

3. The system according to claim 2, wherein the input signal is provided at the resonant frequency of the system.

4. The system according to claim 3, wherein when the DC pulse signal is applied the first magnetic core comprises a north end and a south end opposite from the north end, wherein when the DC pulse signal is applied the second magnetic core comprises a north end and a south end opposite from the north end, wherein the first end of the first primary winding is disposed at the north end of the first magnetic core, and wherein the first end of the second primary winding is disposed at the south end of the second magnetic core.

5. The system according to claim 2, wherein when the DC pulse signal is applied the first magnetic core comprises a north end and a south end opposite from the north end, wherein when the DC pulse signal is applied the second magnetic core comprises a north end and a south end opposite from the north end, wherein the first end of the first primary winding is disposed at the north end of the first magnetic core, and wherein the first end of the second primary winding is disposed at the south end of the second magnetic core.

6. The system according to claim 1, wherein the first primary winding comprises a first insulative coating, wherein the second primary winding comprises a second insulative coating, wherein the first secondary winding wire comprises a third insulative coating, wherein the second secondary winding wire comprises a fourth insulative coating, wherein the third secondary winding wire comprises a fifth insulative coating, wherein the fourth secondary winding wire comprises a sixth insulative coating, wherein each connection wire of the plurality of connection wires comprises a respective seventh insulative coating.

7. The system according to claim 6, wherein the first primary winding is wound around the first secondary winding wire and the second secondary winding wire such that the first primary winding is in physical contact with at least one of the first secondary winding and the second secondary winding, and wherein the second primary winding is wound around the third secondary winding wire and the fourth secondary winding wire such that the second primary winding is in physical contact with at least one of the third secondary winding and the fourth secondary winding.

8. The system according to claim 7, wherein the first secondary winding wire and the second secondary winding wire are wound around the first magnetic core such that each of the first secondary winding wire and the second secondary winding wire is disposed closer to the first magnetic core than is the first primary winding, and wherein the third secondary winding wire and the fourth secondary winding wire are wound around the second magnetic core such that each of the third secondary winding wire and the fourth secondary winding wire is disposed closer to the second magnetic core than is the second primary winding.

9. The system according to claim 1, wherein the first secondary winding wire and the second secondary winding wire are wound around the first magnetic core such that each of the first secondary winding wire and the second secondary winding wire is disposed closer to the first magnetic core than is the first primary winding, and wherein the third secondary winding wire and the fourth secondary winding wire are wound around the second magnetic core such that each of the third secondary winding wire and the fourth secondary winding wire is disposed closer to the second magnetic core than is the second primary winding.

10. The system according to claim 1, wherein the magnetic core comprises iron.

11. The system according to claim 1, wherein the magnetic core is an iron core.

12. The system according to claim 1, wherein the first magnetic core has a linear form factor, and wherein the second magnetic core has a linear form factor.

13. The system according to claim 1, wherein the first magnetic core has a toroid form factor, and wherein the second magnetic core has a toroid form factor.

14. The system according to claim 1, wherein the metal of the first primary winding, the metal of the second primary winding, the metal of the first secondary winding wire, the metal of the second secondary winding wire, the metal of the third secondary winding wire, the metal of the fourth secondary winding wire, and the metal of each connection wire of the plurality of connection wires are the same material as each other.

15. The system according to claim 1, wherein the first magnetic core is disposed in its individual capacitive field with the first primary winding, the first secondary winding, and the second secondary winding, and wherein the second magnetic core is disposed in its individual capacitive field with the second primary winding, the third secondary winding, and the fourth secondary winding.

16. A method for amplifying power, the method comprising:

providing the system according to claim 1;

inputting the input signal to the first end of the first primary winding and the first end of the second primary winding; and receiving an amplified output signal from at least one of the first secondary winding wire, the second secondary winding wire, the third secondary winding wire, and the fourth secondary winding wire, wherein the input signal is a DC pulse signal.

17. The method according to claim 16, wherein the input signal is provided at the resonant frequency of the system.

18. A system for amplifying power, the system comprising:

a first magnetic core;

a first primary winding wound around the first magnetic core in a first winding direction, the first winding direction being a clockwise direction or a counterclockwise direction;

a first secondary winding wire wound around the first magnetic core in the first winding direction;

a second secondary winding wire wound around the first magnetic core in the first winding direction;

a second magnetic core physical spaced apart from the first magnetic core;

a second primary winding wound around the second magnetic core in a second winding direction, the second winding direction being opposite from the first winding direction;

a third secondary winding wire wound around the second magnetic core in the second winding direction;

a fourth secondary winding wire wound around the second magnetic core in the second winding direction;

a plurality of connection wires electrically connecting the first secondary winding wire, the second secondary winding wire, the third secondary winding wire, and the fourth secondary winding wire, wherein the first primary winding comprises a first end configured to receive an input signal and a second end opposite from the first end and configured to output an output signal, wherein the second primary winding comprises a first end configured to receive the input signal and a second end opposite from the first end and configured to output the output signal, wherein each of the first primary winding, the second primary winding, the first secondary winding wire, the second secondary winding wire, the third secondary winding wire, the fourth secondary winding wire, and each connection wire of the plurality of connection wires comprises metal, wherein the input signal is a direct current (DC) pulse signal, wherein the first secondary winding wire and the second secondary winding wire are wound around the first magnetic core such that each of the first secondary winding wire and the second secondary winding wire is disposed closer to the first magnetic core than is the first primary winding, wherein the first primary winding is wound around the first secondary winding wire and the second secondary winding wire such that the first primary winding is in physical contact with at least one of the first secondary winding and the second secondary winding, wherein the third secondary winding wire and the fourth secondary winding wire are wound around the second magnetic core such that each of the third secondary winding wire and the fourth secondary winding wire is disposed closer to the second magnetic core than is the second primary winding, wherein the second primary winding is wound around the third secondary winding wire and the fourth secondary winding wire such that the second primary winding is in physical contact with at least one of the third secondary winding and the fourth secondary winding, wherein when the DC pulse signal is applied the first magnetic core comprises a north end and a south end opposite from the north end, wherein when the DC pulse signal is applied the second magnetic core comprises a north end and a south end opposite from the north end, wherein the first end of the first primary winding is disposed at the north end of the first magnetic core, wherein the first end of the second primary winding is disposed at the south end of the second magnetic core, wherein the magnetic core comprises iron, wherein the first primary winding comprises a first insulative coating, wherein the second primary winding comprises a second insulative coating, wherein the first secondary winding wire comprises a third insulative coating, wherein the second secondary winding wire comprises a fourth insulative coating, wherein the third secondary winding wire comprises a fifth insulative coating, wherein the fourth secondary winding wire comprises a sixth insulative coating, wherein each connection wire of the plurality of connection wires comprises a respective seventh insulative coating, wherein the first magnetic core has a predetermined form factor and the second magnetic core has the predetermined form factor, and wherein the predetermined form factor is a linear form factor or a toroid form factor.

19. A method for amplifying power, the method comprising:

providing the system according to claim 18;

inputting the DC pulse signal to the first end of the first primary winding and the first end of the second primary winding; and receiving an amplified output signal from at least one of the first secondary winding wire, the second secondary winding wire, the third secondary winding wire, and the fourth secondary winding wire.

20. The method according to claim 19, wherein the input signal is provided at the resonant frequency of the system.

* * * * *